United States Patent
Hiramatsu et al.

(10) Patent No.: US 12,286,100 B2
(45) Date of Patent: Apr. 29, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Naoto Hiramatsu, Wako (JP); Yoshimitsu Murahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 17/960,838

(22) Filed: Oct. 6, 2022

(65) Prior Publication Data
US 2023/0115593 A1    Apr. 13, 2023

(30) Foreign Application Priority Data

Oct. 12, 2021    (JP) .................. 2021-167278

(51) Int. Cl.
*B60W 30/09*    (2012.01)
*G06V 20/58*    (2022.01)

(52) U.S. Cl.
CPC .............. *B60W 30/09* (2013.01); *G06V 20/58* (2022.01); *B60W 2420/403* (2013.01); *B60W 2710/20* (2013.01); *B60W 2720/10* (2013.01)

(58) Field of Classification Search
CPC ........... B60W 30/09; B60W 2420/403; B60W 2710/20; B60W 2720/10; G06V 20/58; G06V 10/46; G06V 20/588
See application file for complete search history.

(56) References Cited

U.S. PATENT DOCUMENTS 6,590,521 B1 *    7/2003    Saka ................. G06V 20/58
                                              342/55
2015/0329049 A1    11/2015    Kanou et al.
(Continued)

FOREIGN PATENT DOCUMENTS

JP    2000-048183    2/2000
JP    2002-029348    1/2002
(Continued)

OTHER PUBLICATIONS

T. Partanen, P. Müller, J. Collin and J. Björklund, "Implementation and Accuracy Evaluation of Fixed Camera-Based Object Positioning System Employing CNN-Detector," 2021 9th European Workshop on Visual Information Processing (EUVIP), Paris, France, 2021, pp. 1-6 (Year: 2021).*

(Continued)

*Primary Examiner* — Russell Frejd
*Assistant Examiner* — Ana D Thomas
(74) *Attorney, Agent, or Firm* — Amin, Turocy & Watson, LLP

(57) ABSTRACT

A vehicle control device according to an embodiment includes an imager configured to image surroundings of a host vehicle, a recognizer configured to recognize a surroundings situation of the host vehicle, a driving controller configured to control one or both of speed and steering of the host vehicle on the basis of a result of the recognition of the recognizer, and a controller configured to control the driving controller on the basis of imaging content of the imager, and the controller performs scanning on an object present around the host vehicle on a two-dimensional image captured by the imager at an angle serving as a predetermined angle upward from left and right lower ends of the two-dimensional image, and sets a point first coming in contact with the object as a ground contact point of the object.

9 Claims, 16 Drawing Sheets

(56) References Cited

U.S. PATENT DOCUMENTS

2021/0240197 A1* 8/2021 Shalev-Shwartz .......................... B60W 60/001
2021/0365696 A1* 11/2021 He .......................... G06T 7/12

FOREIGN PATENT DOCUMENTS

| | | |
|---|---|---|
| JP | 2003-308599 | 10/2003 |
| JP | 2015-219773 | 12/2015 |
| JP | 2015-225546 | 12/2015 |
| JP | 2020-003971 | 1/2020 |

OTHER PUBLICATIONS

S. R. Kundur and D. Raviv, "Vision-based fuzzy controllers for navigation tasks," Proceedings of the Intelligent Vehicles '95. Symposium, Detroit, MI, USA, 1995, pp. 287-292, doi: 10.1109/IVS.1995.528295. (Year: 1995).*

N. Kehtarnavaz, N. C. Griswold and J. S. Lee, "Visual control of an autonomous vehicle (BART)—the vehicle-following problem," in IEEE Transactions on Vehicular Technology, vol. 40, No. 3, pp. 654-662, Aug. 1991 (Year: 1991).*

Japanese Notice of Allowance for Japanese Patent Application No. 2021-167278 mailed Jul. 11, 2023.

* cited by examiner

FIG. 10
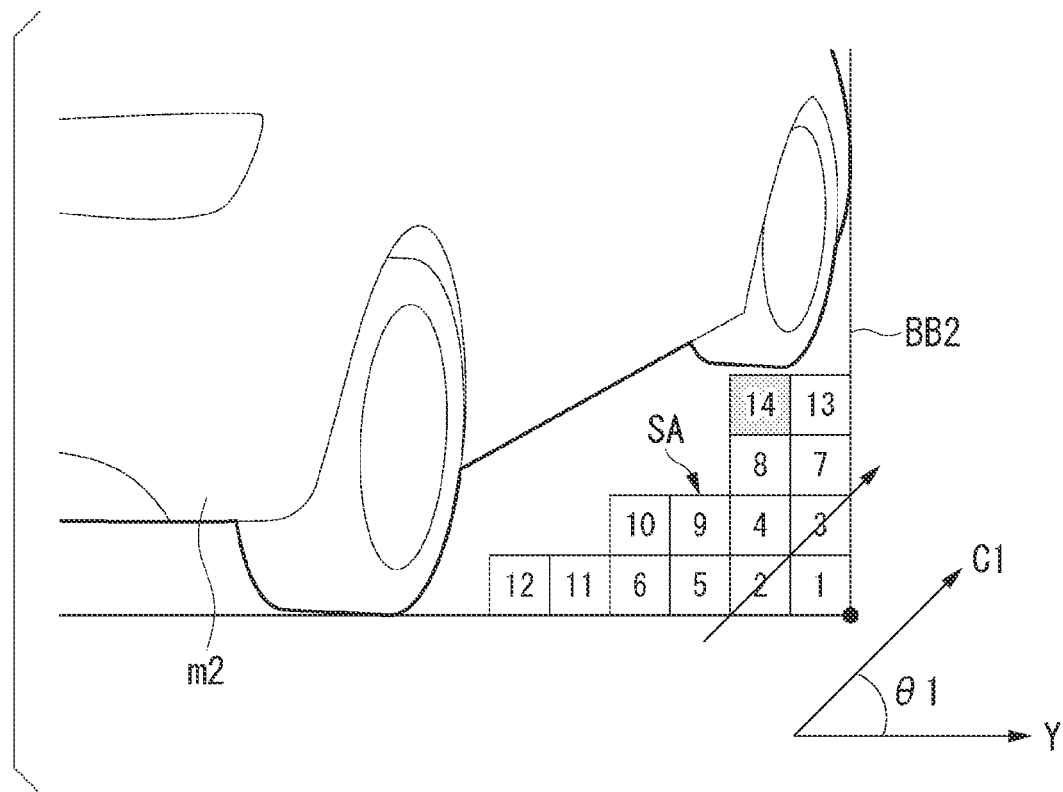
FIG. 11
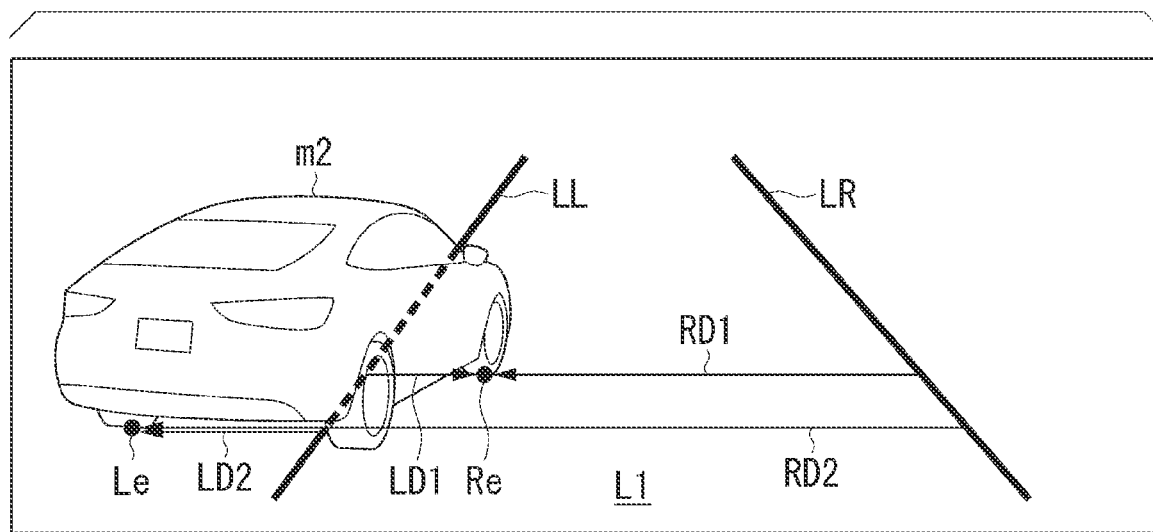
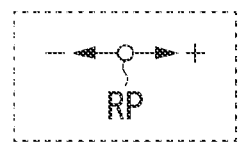

FIG. 13

| CONDITION TYPE | CONDITION CONTENT | BELONGING LANE |
|---|---|---|
| 1 | RELATIVE POSITION OF Le VIEWED FROM LL IS POSITIVE AND RELATIVE POSITION OF Le VIEWED FROM LR IS NEGATIVE | HOST LANE |
| 2 | RELATIVE POSITION OF Re VIEWED FROM LL IS POSITIVE AND RELATIVE POSITION OF Re VIEWED FROM LR IS NEGATIVE | HOST LANE |
| 3 | RELATIVE POSITION OF Le VIEWED FROM LL IS NEGATIVE | LEFT LANE |
| 4 | RELATIVE POSITION OF Re VIEWED FROM LR IS POSITIVE | RIGHT LANE |
| 5 | RELATIVE POSITION OF Le VIEWED FROM LL IS NEGATIVE AND RELATIVE POSITION OF Re VIEWED FROM LL IS POSITIVE | LEFT LANE, HOST LANE |
| 6 | RELATIVE POSITION OF Le VIEWED FROM LR IS NEGATIVE AND RELATIVE POSITION OF Re VIEWED FROM LR IS POSITIVE | RIGHT LANE, HOST LANE |
| 7 | RELATIVE POSITION OF Le VIEWED FROM LL IS POSITIVE AND RELATIVE POSITION OF Re VIEWED FROM LR IS NEGATIVE | HOST LANE |
| 8 | RELATIVE POSITION OF Re VIEWED FROM LL IS POSITIVE AND RELATIVE POSITION OF Le VIEWED FROM LR IS NEGATIVE | HOST LANE |

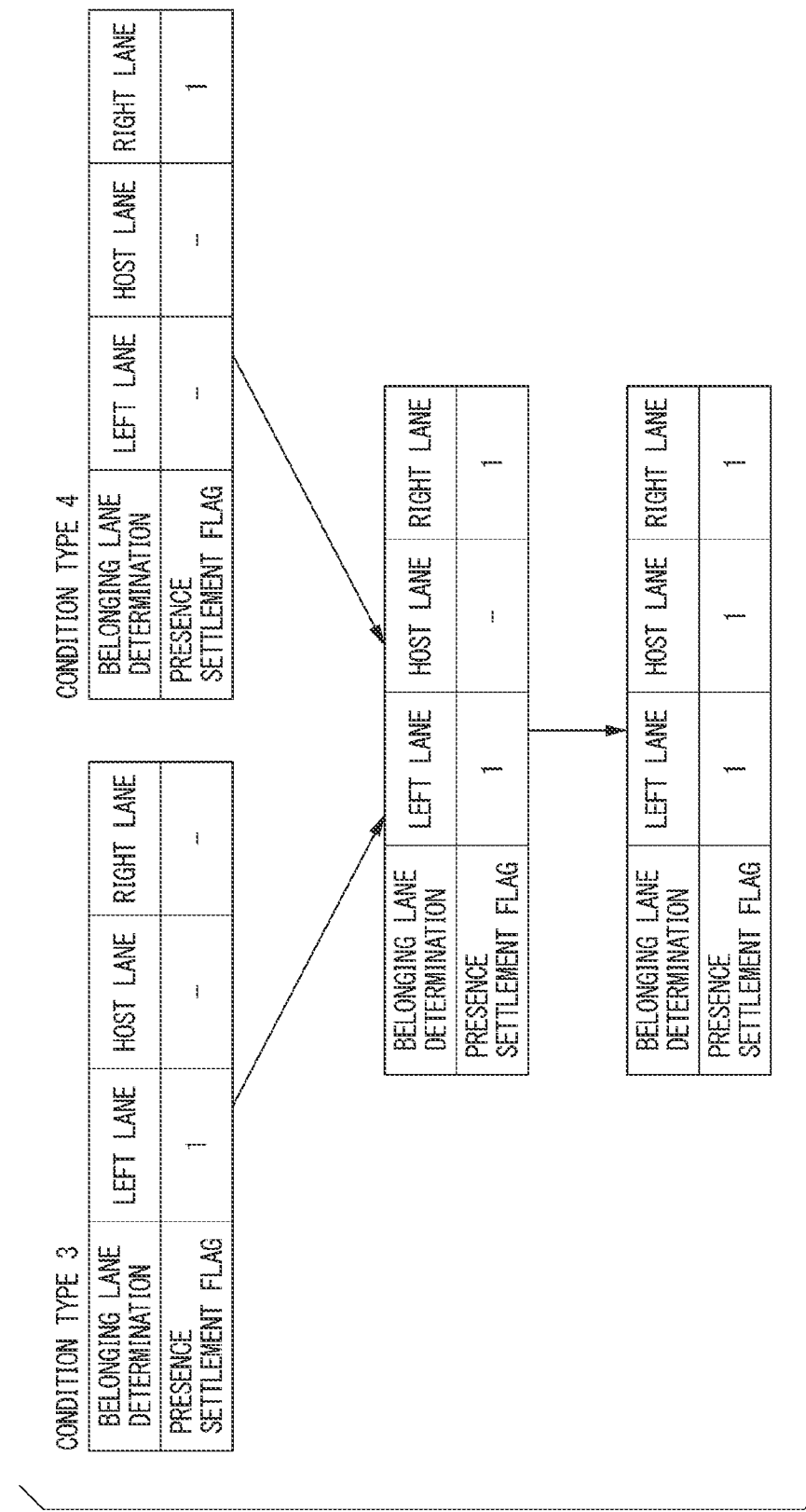

FIG. 15

| CONDITION TYPE | CONDITION CONTENT | ABSENCE LANE |
|---|---|---|
| A | RELATIVE POSITION OF Re VIEWED FROM LL IS NEGATIVE | HOST LANE, RIGHT LANE |
| B | RELATIVE POSITION OF Le VIEWED FROM LR IS POSITIVE | HOST LANE, LEFT LANE |
| C | RELATIVE POSITION OF Le VIEWED FROM LL IS POSITIVE | LEFT LANE |
| D | RELATIVE POSITION OF Re VIEWED FROM LR IS NEGATIVE | RIGHT LANE |

FIG. 16

| BELONGING LANE DETERMINATION | LEFT LANE | HOST LAN | RIGHT LANE |
|---|---|---|---|
| PRESENCE SETTLEMENT FLAG | 1 | 1 | – |
| ABSENCE SETTLEMENT FLAG | – | – | 1 |

FIG. 17

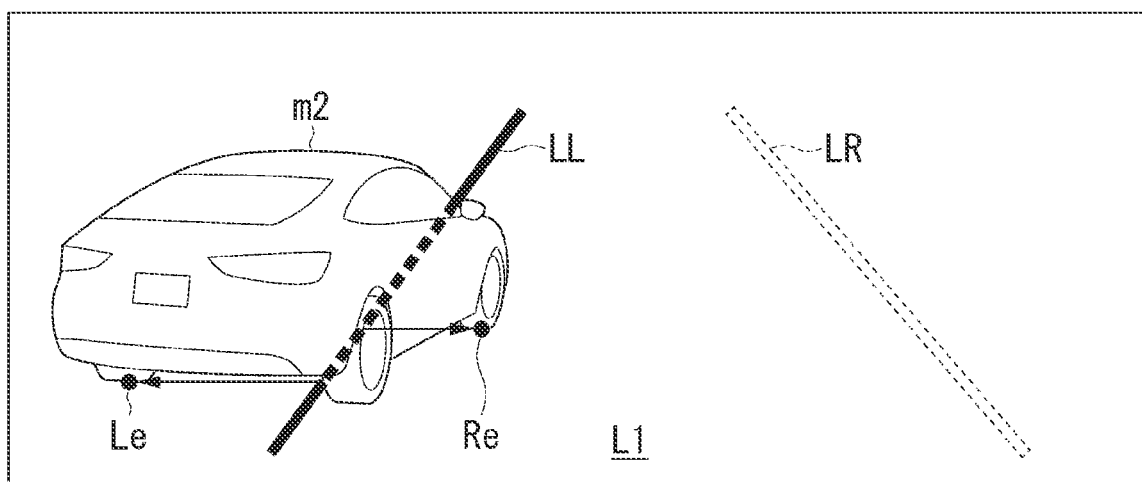

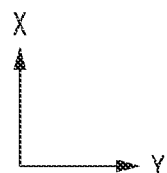

FIG. 20
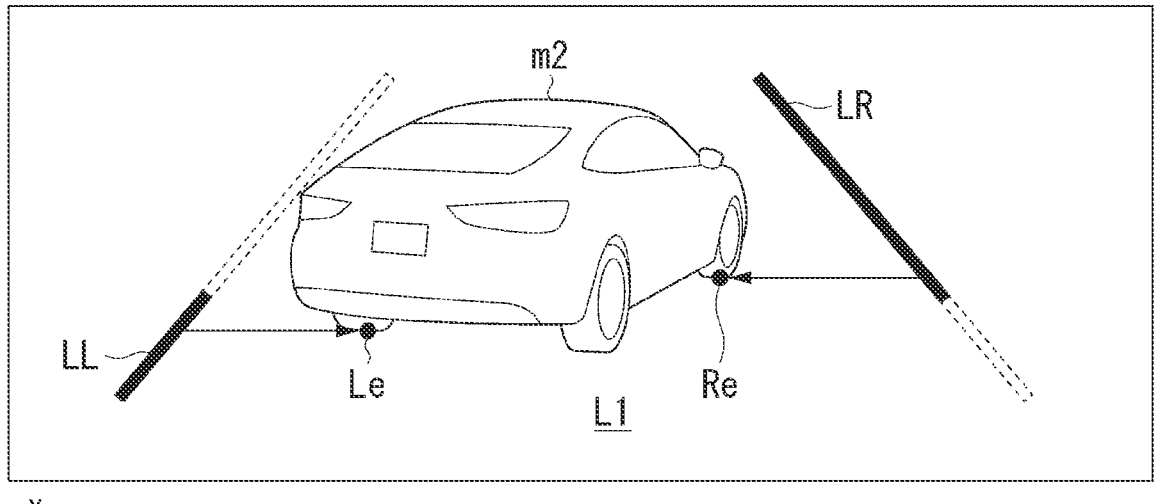
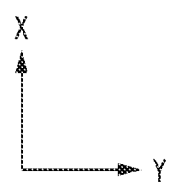
FIG. 21
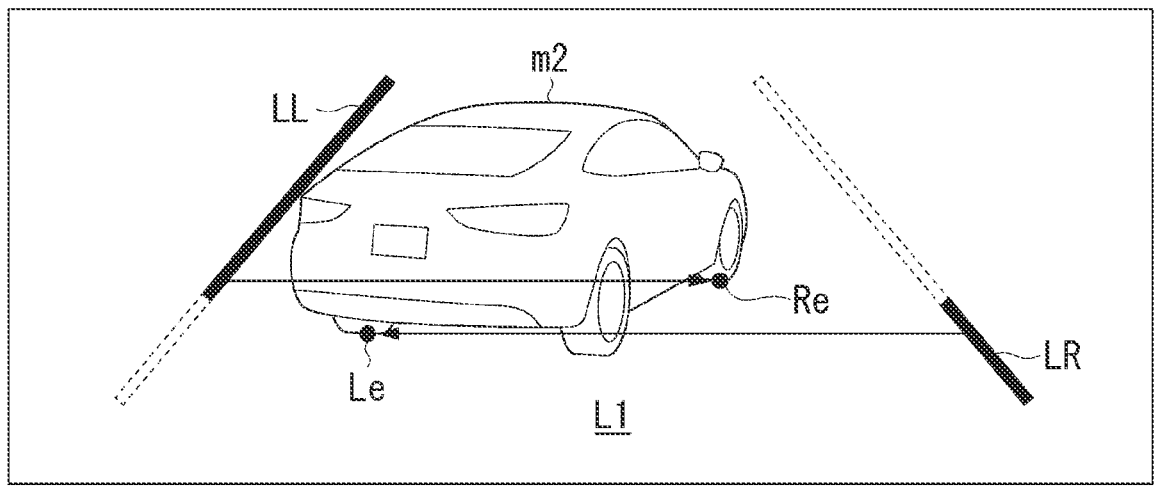
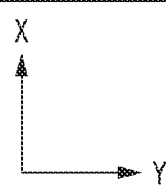

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-167278, filed Oct. 12, 2021, the content of which is incorporated herein by reference.

BACKGROUND

Field of the Invention

The present invention relates to a vehicle control device, a vehicle control method, and a storage medium.

Description of Related Art

In recent years, with the aim of providing a sustainable transportation system by improving traffic safety or convenience, research has been conducted on automatically controlling the traveling of vehicles that transport occupants on the basis of a result of recognizing a surroundings situation. In relation to this, in the field of recognizing surroundings of a vehicle, a technology for extracting a plurality of feature points constituting a moving object from an image, calculating a variance of a vector, and determining that the moving object is likely to cut into a host lane when a variance of a component in a road width direction of the vector is equal to or larger than a threshold value is known (for example, Japanese Unexamined Patent Application, First Publication No. 2020-3971).

SUMMARY

However, in the related art, a load of processing such as the calculation of the variance is large, and cut-in determination processing is likely to be complicated. In the field of driving control, real-time control according to a surrounding situation is required, but when the calculation of the variance is simplified in order to reduce the processing load, positional accuracy of a vehicle is degraded and traffic safety cannot be guaranteed in some cases.

Aspects of the present invention have been made in consideration of such circumstances, and one object of the present invention is to provide a vehicle control device, a vehicle control method, and a storage medium capable of more accurately recognizing a position of an object included in an image to perform driving control of a host vehicle, and further improving traffic safety.

The vehicle control device, vehicle control method, and storage medium according to the present invention adopt the following configuration.

(1): A vehicle control device according to an aspect of the present invention is a vehicle control device including: an imager configured to image surroundings of a host vehicle; a recognizer configured to recognize a surroundings situation of the host vehicle; a driving controller configured to control one or both of speed and steering of the host vehicle on the basis of a result of the recognition of the recognizer; and a controller configured to control the driving controller on the basis of imaging content of the imager, wherein the controller performs scanning on an object present around the host vehicle on a two-dimensional image captured by the imager at an angle serving as a predetermined angle upward from left and right lower ends of the two-dimensional image, and sets a point first coming in contact with the object as a ground contact point of the object.

(2): In the aspect (1), the controller sets a rectangular area surrounded by the object on the two-dimensional image, and performs scanning each set rectangular area upward from left and right lower ends of the rectangular area at the angle serving as the predetermined angle, to acquire the left and right ground contact points of the object.

(3): In the aspect (2), the predetermined angle is an angle formed by the lower end of the two-dimensional image captured by the imager and a demarcation line included in the two-dimensional image.

(4): In the aspect (3), the predetermined angle is an angle when demarcation lines of a predetermined area with reference to a position of the demarcation line coming in contact when the lower end of the rectangular area extends in a lateral direction of the two-dimensional image is viewed from a left-right direction of the two-dimensional image.

(5): In the aspect (4), the controller sets the predetermined angle to a fixed value when the angle of the demarcation line with respect to the left-right direction of the two-dimensional image exceeds a threshold value.

(6): In the aspect (5), the fixed value is 45 degrees.

(7): In the aspect (1), the controller corrects a position of the object recognized by the recognizer on the basis of the ground contact point of the object, and controls the driving controller on the basis of the corrected position of the object.

(8): A vehicle control method according to an aspect of the present invention is a vehicle control method including, on a computer: imaging, by an imager, surroundings of a host vehicle; recognizing a surroundings situation of the host vehicle; executing driving control to control one or both of speed and steering of the host vehicle on the basis of a result of the recognition; controlling the driving controller on the basis of imaging content of the imager; and performing scanning on an object present around the host vehicle on a two-dimensional image captured by the imager at an angle serving as a predetermined angle upward from left and right lower ends of the two-dimensional image, and setting a point first coming in contact with the object as a ground contact point of the object.

(9): A storage medium according to an aspect of the present invention is a computer-readable non-transitory storage medium having a program stored therein, the program causing a computer to: image surroundings of a host vehicle using an imager; recognize a surroundings situation of the host vehicle; execute driving control to control one or both of speed and steering of the host vehicle on the basis of a result of the recognition; control the driving controller on the basis of imaging content of the imager; and perform scanning on an object present around the host vehicle on a two-dimensional image captured by the imager at an angle serving as a predetermined angle upward from left and right lower ends of the two-dimensional image, and set a point first coming in contact with the object as a ground contact point of the object.

According to the aspects (1) to (9) above, it is possible to more accurately recognize a position of an object included in an image to perform driving control of a host vehicle, and further improve traffic safety.

BRIEF DESCRIPTION OF THE DRAWINGS

FIG. 10 is a diagram illustrating acquisition of edges of the other vehicle using segmentation areas.

FIG. 11 is a diagram illustrating a determination of a lane to which another vehicle belongs.

FIG. 13 is a diagram illustrating a plurality of determination conditions.

FIG. 14 is a diagram illustrating content of processing of steps S212 to S214.

FIG. 15 is a diagram illustrating processing for determining an absence settlement lane.

FIG. 16 is a diagram illustrating an example of information in which flags are set.

FIG. 17 is a diagram illustrating a first determination pattern.

FIG. 20 is a diagram illustrating a fourth determination pattern.

FIG. 21 is a diagram illustrating a second scene in which a part of each of both demarcation lines cannot be recognized.

DESCRIPTION OF EMBODIMENTS

Hereinafter, embodiments of a vehicle control device, a vehicle control method, and a storage medium of the present invention will be described with reference to the drawings. It is assumed that the vehicle control device of the embodiment is mounted in a vehicle. The vehicle is, for example, a vehicle such as a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

Overall Configuration

Figure 1:
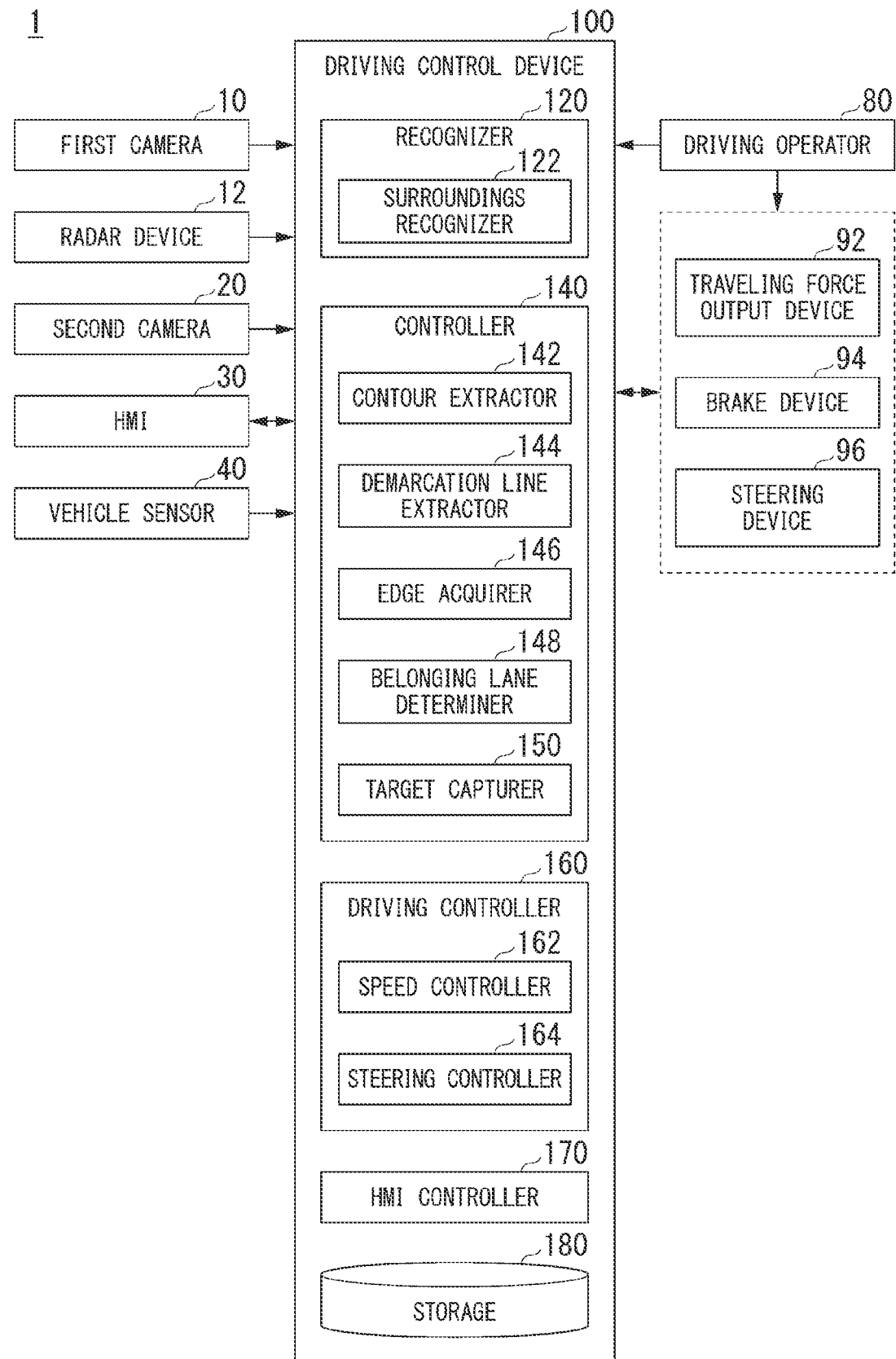
FIG. 1 is a diagram illustrating an example of a configuration of a vehicle system having a vehicle control device according to an embodiment mounted therein.

FIG. 1 is a diagram illustrating an example of a configuration of a vehicle system 1 equipped with a vehicle control device according to an embodiment. A vehicle system 1 illustrated in FIG. 1 includes, for example, a first camera 10, a radar device 12, a second camera 20, a human machine interface (HMI) 30, a vehicle sensor 40, a driving operator 80, and a traveling force output device 92, a brake device 94, a steering device 96, and a driving control device 100. These devices or equipment are connected to each other by a multiplex communication line such as a controller area network (CAN) communication line, a serial communication line, a wireless communication network, or the like. The configuration illustrated in FIG. 1 is merely an example, and a part of the configuration may be omitted or other configurations may be added. The second camera 20 is an example of an "imager". The imager may include the first camera 10. The second camera 20 and the driving control device 100 are examples of a "vehicle control device."

The first camera 10 is, for example, a digital camera using a solid-state imaging device such as a charge coupled device (CCD) or a complementary metal oxide semiconductor (CMOS). One or a plurality of first cameras 10 are attached to any location on a vehicle (hereinafter, a host vehicle M) in which the vehicle system 1 is mounted. For example, when a forward side of the host vehicle M is imaged, the first camera 10 is attached to, for example, an upper portion of a front windshield, a rear surface of a rearview mirror, or the like. When a backward side of the host vehicle M is imaged, the first camera 10 is attached to an upper portion of a rear windshield, a back door, or the like. When a sideward side and a rear sideward side of the host vehicle M are imaged, the first camera 10 is attached to a door mirror or the like. The first camera 10, for example, periodically and repeatedly images surroundings of the host vehicle M. The first camera 10 may be a stereo camera.

The first camera 10 further includes a fisheye camera capable of imaging the surroundings of the host vehicle M at a wide angle (for example, at 360 degrees). The fisheye camera is attached, for example, to an upper portion of the host vehicle M and images the surroundings of the host vehicle M at a wide angle in a horizontal direction. The fisheye camera may be realized by combining a plurality of cameras (a plurality of cameras that image a range of 120 degrees or a range of 60 degrees in the horizontal direction).

The radar device 12 radiates radio waves such as millimeter waves to the surroundings of the host vehicle M and detects radio waves (reflected waves) reflected by an object in the surroundings to detect at least a position (a distance and orientation) of the object. One or a plurality of radar devices 12 are attached to arbitrary locations on the host vehicle M. The radar device 12 may detect a position and speed of the object in the surroundings using a frequency modulated continuous wave (FM-CW) scheme.

The second camera 20, for example, a digital camera using a solid-state imaging device such as a CCD or CMOS. One or a plurality of second cameras 20 are attached to arbitrary locations on the host vehicle M. The second camera 20 may be provided at the same position as that of the first camera 10 or may be provided at a part of an installation position of the first camera 10 (for example, a position at which a forward side from the host vehicle M is imaged). The second camera 20, for example, repeatedly images the surroundings of the host vehicle M periodically. The second camera 20 may be a stereo camera.

The HMI 30 presents various types of information to a user of the host vehicle M and receives an input operation from the user. Examples of the user include a driver who drives the host vehicle M and an occupant such as a fellow occupant. In the following description, an "occupant" will be used unless otherwise specified. The HMI 30 includes, for example, a display and a speaker as outputs that present various types of information. The display displays an image under the control of an HMI controller 170, which will be described below, and the speaker outputs sound under the control of the HMI controller 170. The HMI 30 includes a touch panel, switches, keys, a microphone, or the like as an input that receives an input from the occupant. Information received by the input is output to the HMI controller 170.

The vehicle sensor 40 includes, for example, a vehicle speed sensor that detects a speed of the host vehicle M, an acceleration sensor (three-axis G sensor) that detects an acceleration, a yaw rate sensor that detects a yaw rate (for example, a rotation angle speed around a vertical axis passing through a point of a center of gravity of the host vehicle M), and an orientation sensor that detects a direction of the host vehicle M. The vehicle sensor 40 may include a position sensor that acquires a position of the host vehicle M. The position sensor is, for example, a sensor that acquires position information (longitude and latitude information) from a global positioning system (GPS) device. The position sensor may be, for example, a sensor that acquires the position information using a global navigation satellite system (GNSS) receiver. The GNSS receiver specifies the position of the host vehicle M on the basis of a signal received from a GNSS satellite. The position of the host vehicle M may be specified or complemented by an inertial navigation system (INS) using outputs of other sensors. A result of detection of the vehicle sensor 40 is output to the driving control device 100.

The driving operator 80 includes, for example, various operators such as a steering wheel with which a driver performs a steering operation, an accelerator pedal, a brake pedal, and a shift lever. An operation detector that detects an amount of operation performed by the driver, for example, is attached to each operator of the driving operator 80. The operation detectors detect an amount of depression of the accelerator pedal or the brake pedal, a position of the shift lever, a steering angle or steering torque of the steering wheel, and the like. The operation detector outputs a detection signal indicating a detection result to the driving control device 100 or one or both of the traveling force output device 92, the brake device 94, and the steering device 96.

The travel traveling force output device 92 outputs a travel driving force (torque) for traveling of the host vehicle M to driving wheels. The travel traveling force output device 92 includes, for example, a combination of an internal combustion engine, an electric motor, a transmission, and the like, and a power electronic control unit (ECU) that controls these. The power ECU controls the above configuration according to information input from the driving control device 100 or information input from the driving operator 80.

The brake device 94 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving control device 100 or the information input from the driving operator 80 so that a brake torque according to a braking operation is output to each wheel. The brake device 94 may include a mechanism that transfers the hydraulic pressure generated by an operation with respect to the brake pedal included in the driving operator 80 to the cylinder via a master cylinder, as a backup. The brake device 94 is not limited to the configuration described above and may be an electronically controlled hydraulic brake device that controls an actuator according to the information input from the driving control device 100 and transfers the hydraulic pressure of the master cylinder to the cylinder.

The steering device 96 includes, for example, a steering ECU and an electric motor. The electric motor, for example, changes directions of steerable wheels by causing a force to act on a rack and pinion mechanism. The steering ECU drives the electric motor according to the information input from the driving control device 100 or the information input from the driving operator 80 to change the directions of the steerable wheels.

[Configuration of Driving Control Device 100]

The driving control device 100 includes, for example, a recognizer 120, a controller 140, a driving controller 160, the HMI controller 170, and a storage 180. The recognizer 120, the controller 140, the driving controller 160, and the HMI controller 170 are each realized by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The above-described program may be stored in a storage device (a storage device having a non-transitory storage medium) such as an HDD or a flash memory of the driving control device 100 in advance, or may be stored in a detachable storage medium such as a DVD, a CD-ROM, or memory card and installed in the storage device of the driving control device 100 when the storage medium (non-transitory storage medium) is mounted in a drive device, card slot, or the like.

The storage 180 may be realized by any of various storage devices described above, an electrically erasable programmable read only memory (EEPROM), a read only memory (ROM), a random access memory (RAM), or the like. The storage 180 stores, for example, information necessary for execution of various controls in the embodiment, programs, and various other information.

[Recognizer]

The recognizer 120 includes a surroundings recognizer 122, for example. For example, the surroundings recognizer 122 performs sensor fusion processing or the like on detection results of one or both of the first camera 10 and the radar device 12 to recognize a surroundings situation of the host vehicle M. In this case, the surroundings recognizer 122 performs coordinate transformation of the image obtained from the first camera 10 into a bird's-eye view coordinate system, and performs known schemes (binarization processing, contour extraction processing, image enhancement processing, feature amount extraction processing, pattern matching processing, and the like) on the basis of the transformed coordinate system to recognize the surroundings situation of the host vehicle M. The surroundings recognizer 122 may recognize a position, type, speed, and the like of an object around the host vehicle M. The object is, for example, another vehicle (for example, a surrounding vehicle present within a predetermined distance from the host vehicle M). The object may include a pedestrian, a bicycle, a road structure, and the like. The road structure includes, for example, a road sign, traffic light, curb, median, guardrail, fence, wall, and railroad crossing. The object may include an obstacle that hinder the traveling of the host vehicle M.

The surroundings recognizer 122 recognizes the host vehicle M, and states such as positions (relative position), speed, acceleration, and the like of an object present around the host vehicle M. The position of the object is recognized, for example, as a position in an absolute coordinate system (hereinafter referred to as a vehicle coordinate system) with a representative point (a center of gravity, a center of a drive shaft, or the like) of the host vehicle M as an origin, and used for control. The position of the object may be represented by a representative point such as a center of gravity, corner, or a distal edge in a traveling direction of the object, or may be represented by a represented area. Examples of the speed include speed of the host vehicle M and the other vehicle relative to a traveling direction (a longitudinal direction) of a lane in which the host vehicle M and the other vehicle travel (hereinafter referred to as longitudinal speed), and speed of the host vehicle M and the other vehicle relative to a lateral direction of the lane (hereinafter referred to as lateral speed). Examples of the "state" of the object may include acceleration or jerk of the object when the object is a mobile object such as another vehicle, or a "behavior state" (for example, whether the object is changing lanes or is about to change lanes).

The surroundings recognizer 122 recognizes road marking likes (hereinafter referred to as demarcation lines) that are present around the host vehicle M. For example, the surroundings recognizer 122 recognizes left and right demarcation lines that define a lane in which the host vehicle M travels (hereinafter referred to as a host vehicle lane). The surroundings recognizer 122 separately recognizes an adjacent lane on the left side of the host lane (hereinafter referred to as a left lane) and an adjacent lane on the right side of the host lane (hereinafter referred to as a right lane) on the basis of the left and right demarcation lines.

[Controller]

The controller 140 controls the entire driving control device 100. The controller 140 includes, for example, a contour extractor 142, a demarcation line extractor 144, an edge acquirer 146, a belonging lane determiner 148, and a target capturer 150.

The contour extractor 142 extracts edge points from the two-dimensional image captured by the second camera 20 through existing image analysis processing, and extracts a contour of the object on the two-dimensional image from a sequence of the extracted edge point. The two-dimensional image is an image obtained by expressing the image captured by the second camera 20 in a two-dimensional coordinate system of a longitudinal direction (an X-axis) and a lateral direction (Y-axis) as it is. For example, the contour extractor 142 connects edge points existing within a predetermined distance to extract a contour. The contour extractor 142 may acquire color information for each edge point through image analysis processing for a two-dimensional image, connect the edge points whose acquired colors are similar, and extract the contour. The contour extractor 142 may extract only a contour of another vehicle (an example of a target object) on the basis of a shape, size, position, or the like of the contour. The contour extractor 142 separates and extracts each object when a plurality of objects are present in the two-dimensional image.

The demarcation line extractor 144 extracts demarcation lines included in the two-dimensional image captured by the second camera 20. The demarcation line extractor 144 may separately extract the left and right demarcation lines of the host lane. The demarcation line extractor 144 acquires position information (coordinate information) on the two-dimensional image of the extracted demarcation lines.

The edge acquirer 146 acquires a position (position information on the two-dimensional image) of edges of the target object included in the two-dimensional image captured by the second camera 20. The edges of the target object are, for example, left and right edges on the two-dimensional image. Here, when the target object is another vehicle, edges of the other vehicle are, for example, left and right ground contact points of the other vehicle (points at which the other vehicle comes in contact with the road) in the two-dimensional image. Hereinafter, description is continued using the other vehicle as an example of the target object.

The belonging lane determiner 148 determines a lane to which the other vehicle belongs (a presence settlement lane of the other vehicle) on the basis of position information of the demarcation line extracted by the demarcation line extractor 144 and position information of the edges of the other vehicle acquired by the edge acquirer 146. The belonging lane determiner 148 may determine a lane to which the other vehicle does not belong (a lane in which the other vehicle is settled not to be present) instead of (or in addition to) the lane to which the other vehicle belongs.

The target capturer 150 captures the target vehicle on which the host vehicle M performs driving control using the driving controller 160 on the basis of a recognition result of the recognizer 120 or a result of determining the lane to which the other vehicle belongs from the belonging lane determiner 148 (relative lateral position information of the other vehicle viewed from the host vehicle M). The target vehicle is, for example, a forward vehicle when the host vehicle M tracks the forward vehicle at a predetermined inter-vehicle distance under driving control such as adaptive cruise control (ACC) of the driving controller 160. The target capturer 150 may extract other vehicles that interfere with the traveling of the host vehicle M from among other vehicles that are present around the host vehicle M. The other vehicles that interfere with the traveling of the host vehicle M are, for example, other vehicles that require change in driving control (speed control and steering control) of the host vehicle M due to lane change between a preceding vehicle and the host vehicle M when the host vehicle M tracks the forward vehicle, or other vehicles that are likely to collide with the host vehicle M and require driving control to avoid the collision. Details of functions of the contour extractor 142, the demarcation line extractor 144, the edge acquirer 146, the belonging lane determiner 148, and the target capturer 150 described above will be described below.

The driving controller 160 controls one or both of the speed and steering of the host vehicle M on the basis of a recognition result of the recognizer 120 and information from the controller 140. For example, when the driving controller 160 executes predetermined driving control, the driving controller 160 generates a scheduled trajectory (a goal trajectory) along which the host vehicle M will travel in future, on the basis of the recognition result of the recognizer 120 or the information from the controller 140, in order to cause the host vehicle M to travel according to content of the driving control. The scheduled trajectory includes, for example, a speed element. The driving controller 160 controls the speed or steering of the host vehicle M so that the host vehicle M travels along the generated scheduled trajectory. The driving controller 160 includes, for example, a speed controller 162 and a steering controller 164. For example, when the execution of ACC is received according to an operation with respect to the HMI 30 by the occupant, the speed controller 162 controls the traveling force output device 92 or the brake device 94 to perform speed control such as acceleration or deceleration so that the host vehicle M travels while maintaining a predetermined inter-vehicle distance from a preceding vehicle traveling in the host lane on the basis of the scheduled trajectory. Further, the speed controller 162, for example, controls the traveling force output device 92 or the brake device 94 to perform speed control such as acceleration or deceleration so that the host vehicle M does not contact with the other vehicle on the basis of a situation in which the other vehicle approaches the host vehicle M.

For example, when the steering controller 164 performs driving control such as ACC or Lane Keeping Assistance System (LKAS) according to an operation with respect to the HMI 30 by the occupant, the steering controller 164 controls the steering device 96 on the basis of a result of recognizing the host lane and the position of the host vehicle M, in order to maintain traveling in the host lane on the basis of the scheduled trajectory. For example, when auto lane changing (ALC) is executed according to an operation with respect to the HMI 30 by the occupant, the steering controller 164 controls the steering device 96 to perform lane change to an adjacent goal lane along the scheduled trajectory on the basis of the recognition result of the recognizer 120.

Processing of the speed controller 162 and the steering controller 164 is realized, for example, by a combination of feedforward control and feedback control. As an example, the steering controller 164 executes a combination of feedforward control according to a curvature of the road in front of the host vehicle M and feedback control based on deviation from the scheduled trajectory (goal trajectory).

The HMI controller 170 presents predetermined information to the occupant through the HMI 30. The predetermined information includes, for example, information on a state of the host vehicle M and information on driving control. Examples of the information on the state of the host vehicle M include speed, engine speed, and a shift position of the host vehicle M. Examples of the information on driving control include information controlled by the controller 140, information on whether or not driving control such as ACC or ALC, or manual driving is performed, and information on a situation of driving control that is being executed. The predetermined information may include information irrelevant to traveling control of the host vehicle M, such as a TV program or content (for example, movie) stored in a storage medium such as a DVD.

For example, the HMI controller 170 may generate an image including the predetermined information described above, and cause a display of the HMI 30 to display the generated image, and may generate a sound indicating the predetermined information and cause the generated sound to be output from a speaker of the HMI 30. The HMI controller 170 may output information received by the HMI 30 to the controller 140, the driving controller 160, or the like.

[Control of Vehicle Control Device]

Figure 2:
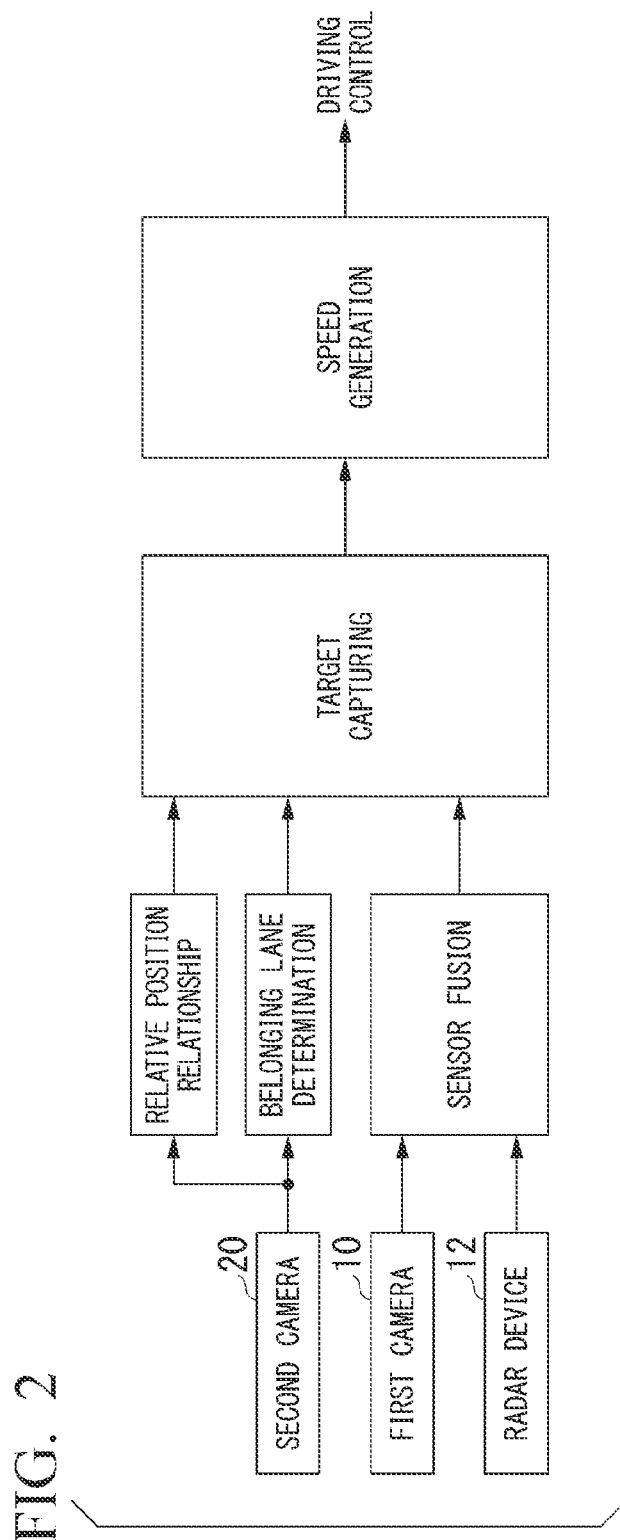
FIG. 2 is a diagram illustrating an example of control that is executed by a driving control device.

Hereinafter, details of control that is executed by the driving control device 100 will be described. FIG. 2 is a diagram illustrating an example of control that is executed by the driving control device 100. Before the driving control device 100 corrects a result of recognizing the surroundings of the host vehicle M through the sensor fusion processing using information output by the first camera 10 and the radar device 12, the driving control device 100 performs, for example, a determination of the lane to which the other vehicle belongs using a two-dimensional image of the surroundings (particularly, a traveling direction) of the host vehicle M captured by the second camera 20, and acquisition of a relative positional relationship between the demarcation line and the other vehicle.

The driving control device 100 can capture another vehicle that is a target tracked by the host vehicle M (hereinafter referred to as a target vehicle), for example, during execution of the driving control such as ACC on the basis of the result of determining the lane to which the other vehicle belongs, the relative positional relationship between the demarcation line and the other vehicle, an object recognition result through the sensor fusion processing, and the like, generate, for example, speed of the host vehicle M on the basis of the above and the like on the basis of information on the captured target vehicle (for example, a position, relative distance, relative speed, target vehicle distance, and traveling direction of the target vehicle) or the like, and cause the host vehicle M to travel at the generated speed. Thus, in the embodiment, it is possible to curb error and contradiction in a relative position between the other vehicle and the host lane, by specifying the belonging lane or acquiring the relative positional relationship in a coordinate system of the two-dimensional image without performing, for example, three-dimensional coordinate transformation for obtaining a bird's-eye view image, using the two-dimensional image captured by the second camera 20, and it is possible to capture the target vehicle for performing driving control on the basis of a more accurate relative position. The driving control device 100 may perform steering control instead of (or in addition to) the speed control.

[Processing Flow]

Figure 3:
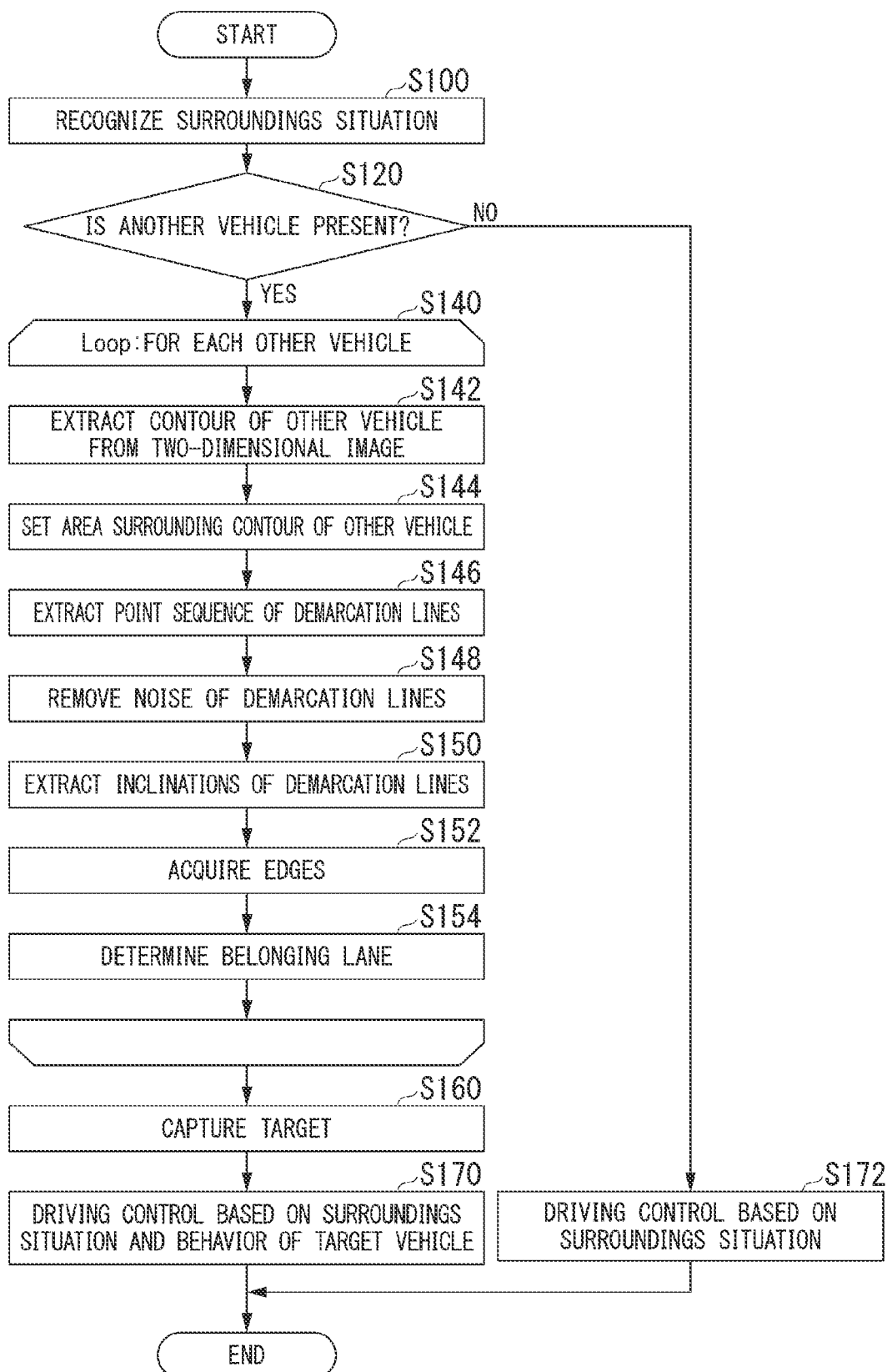
FIG. 3 is a flowchart illustrating an example of a flow of processing that is executed by the driving control device.

Next, a flow of processing that is executed by the driving control device 100 according to the embodiment will be described. FIG. 3 is a flowchart illustrating an example of the flow of processing that is executed by the driving control device 100. In the following description, processing when the host vehicle M executes driving control of an ACC among processing that is executed by the driving control device 100 will be mainly described. The processing illustrated in FIG. 3 may be repeatedly executed while the driving control is being executed.

In the example of FIG. 3, the recognizer 120 first recognizes the surroundings situation including in front of the host vehicle M through sensor fusion processing using outputs from the first camera 10 and the radar device 12 (step S100). The recognizer 120 determines whether or not another vehicle is present around the host vehicle M (step S120). The other vehicle is an example of the target object, and more specifically, is another vehicle that is traveling in front of the host vehicle M.

The forward side of the host vehicle M includes not only the forward side on the host lane but also the forward sides on the left lane and the right lane.

Figure 4:
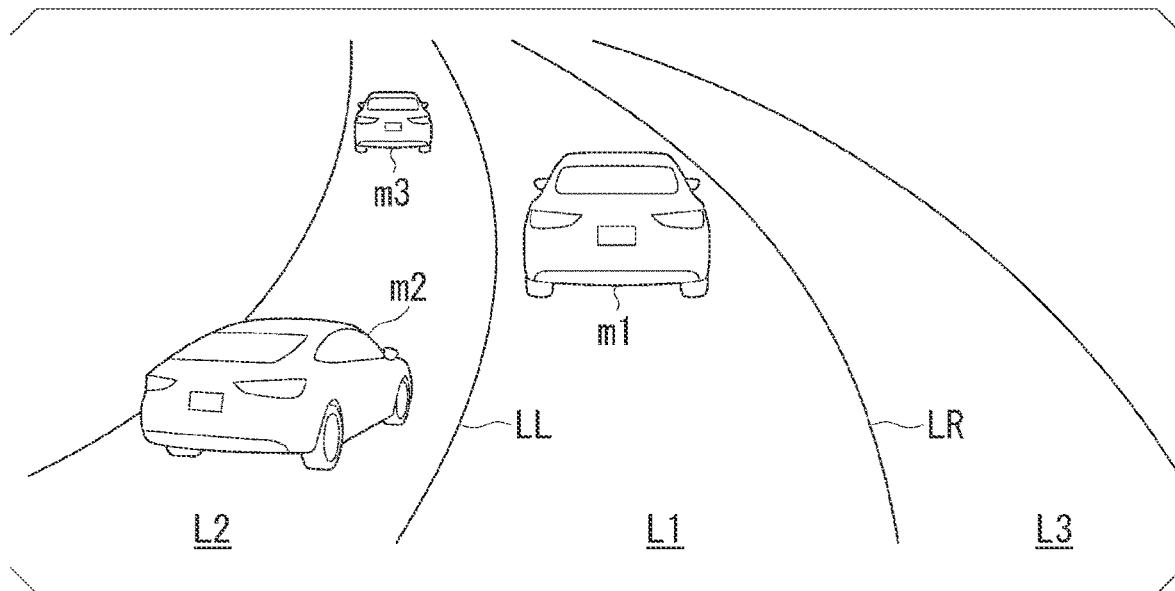
FIG. 4 is a diagram illustrating an example of a surroundings situation of a host vehicle.

FIG. 4 is a diagram illustrating an example of the surroundings situation of the host vehicle M. In the example of FIG. 4, a three-lane road consisting of a lane L1, a left lane L2 of a host lane L1, and a right lane L3 of the host lane L1 is shown. In FIG. 4, it is assumed that the host vehicle M (not illustrated) is traveling in the lane L1 (hereinafter referred to as a host lane L1). In the surroundings situation illustrated in FIG. 4, the recognizer 120 recognizes another vehicle m1 traveling in front of the host vehicle M and in the host lane L1 and other vehicles m2 and m3 traveling in the left lane L2, as target objects present in front of the host vehicle M.

The controller 140 executes the processing of steps S142 to S154 for each of the other vehicles m1 to m3 recognized by the recognizer 120 repeatedly (as a loop) (step S140). The contour extractor 142 extracts a contour of the other vehicle included in the two-dimensional image captured by the second camera 20 (step S142). Next, the contour extractor 142 sets an area surrounding the contour of the other vehicle (step S144).

Figure 5:
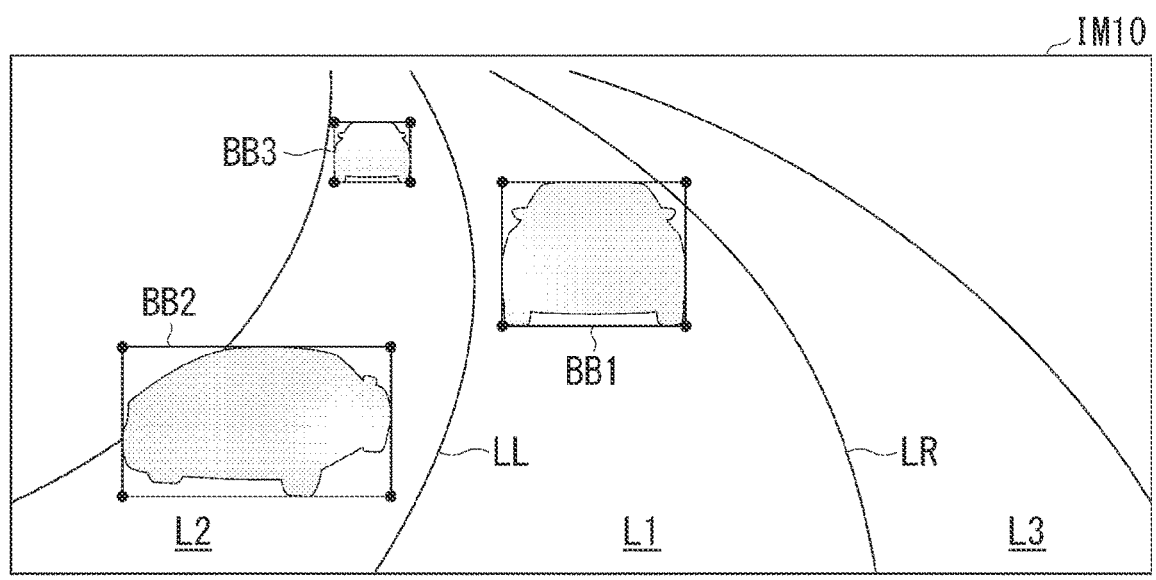
FIG. 5 is a diagram illustrating an area surrounding a contour of another vehicle included in a two-dimensional image.

FIG. 5 is a diagram illustrating the area surrounding the contour of the other vehicle included in the two-dimensional image. In an example of FIG. 5, an image IM10 captured by the second camera 20 in a surroundings situation of the host vehicle M corresponding to FIG. 4 is illustrated. The image IM10 is a two-dimensional image in which the captured image is expressed in an image coordinate system as it is (without three-dimensional coordinate transformation). It is assumed that, in the image IM10 illustrated in FIG. 5, the contours of the other vehicles m1 to m3 are extracted by the contour extractor 142. In the image IM10 illustrated in FIG. 5, the contour extractor 142 generates three areas (hereinafter referred to as bounding boxes) BB1 to BB3 surrounding the extracted contours of the other vehicles m1 to m3 (step S144). The bounding boxes BB1 to BB3 are, for example, rectangular areas formed along an X-axis (a longitudinal direction) and a Y-axis (a lateral direction) of the image IM10. The contour extractor 142 extracts coordinates (XY coordinates) of four corners of each of the bounding boxes BB1 to BB3 at two-dimensional coordinates of the image IM10.

Figure 6:
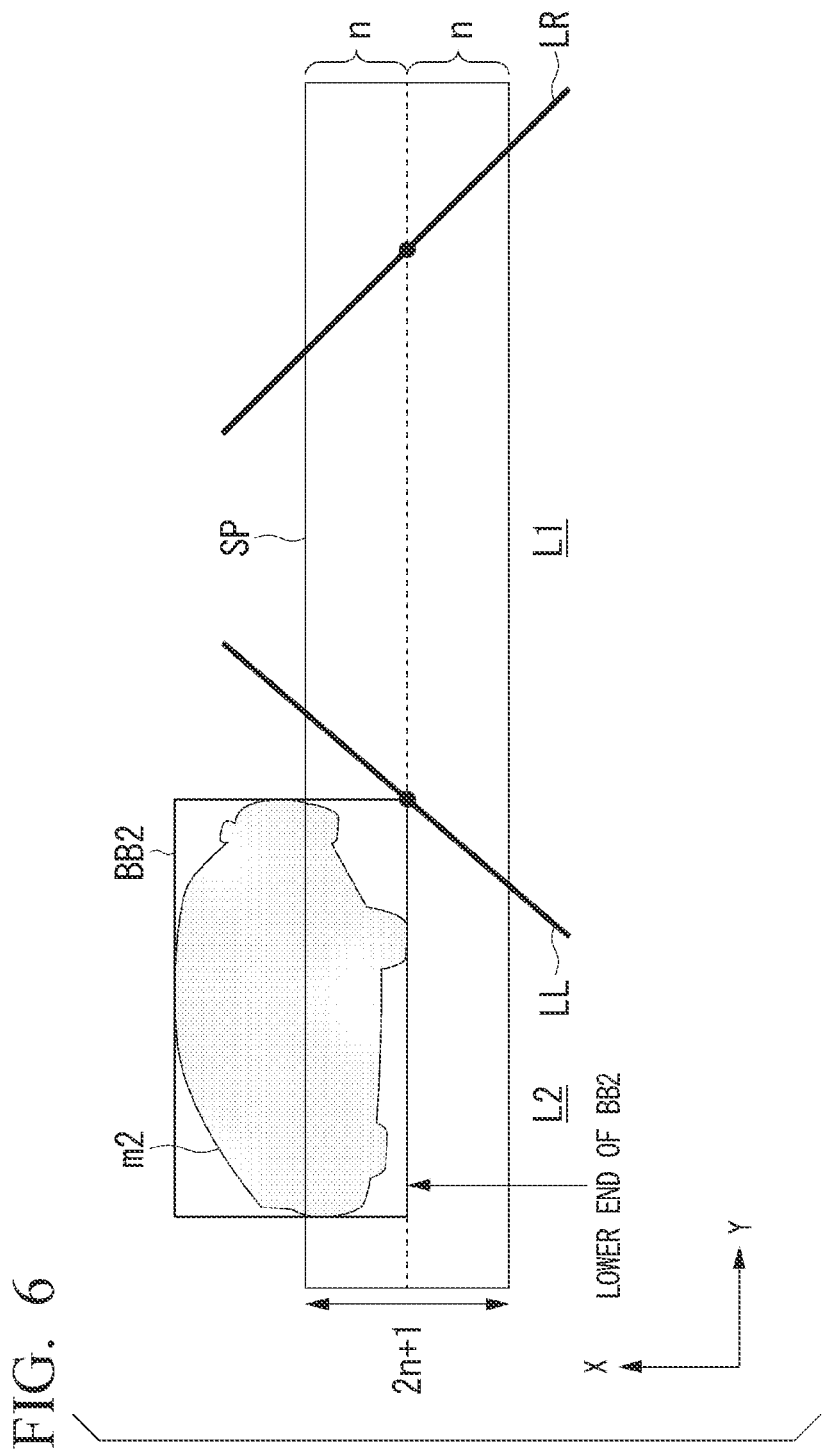
FIG. 6 is a diagram illustrating extraction of demarcation lines.

Next, the demarcation line extractor 144 extracts a point sequence of demarcation lines that define the host lane L1 from the two-dimensional image captured by the second camera 20 (step S146). FIG. 6 is a diagram illustrating the extraction of the demarcation lines. In the example of FIG. 6, portions of the lanes L1 and L2, and the other vehicle m2 traveling in the lane L2 in the image IM10 captured by the second camera 20 are illustrated in an enlarged manner. The demarcation line extractor 144, for example, scans a lower end of the bounding box BB2 of the other vehicle m2 in a lateral direction (a left and right direction or a Y-axis direction) of the image IM10 and acquires a position (XY coordinate position) on the left and right demarcation lines LL and LR that define the host lane L1 at the time of contact with the demarcation lines LL and LR. Further, the demarcation line extractor 144 similarly performs scanning with shift of a predetermined pixel (for example, one pixel) in an up-down direction (an X-axis direction or a longitudinal direction) with reference to a line of the lower end of the bounding box BB2, to extract areas of the demarcation lines LL and LR on the two-dimensional image within a predetermined range (hereinafter referred to as a specific area SP) consisting of 2n+1 pixels in the up-down direction. n is, for example, about 10 to 30 and is, preferably, 20, but may be changed appropriately according to resolution of the two-dimensional image, a surrounding environment of the host vehicle M, and the like. A lateral width of the specific area SP (a range in the left-right direction) corresponds to a lateral width of the image IM10. The demarcation line extractor 144 extracts the demarcation lines LL and LR by connecting point sequences of coordinates obtained from the above-described specific area SP.

Figure 7:
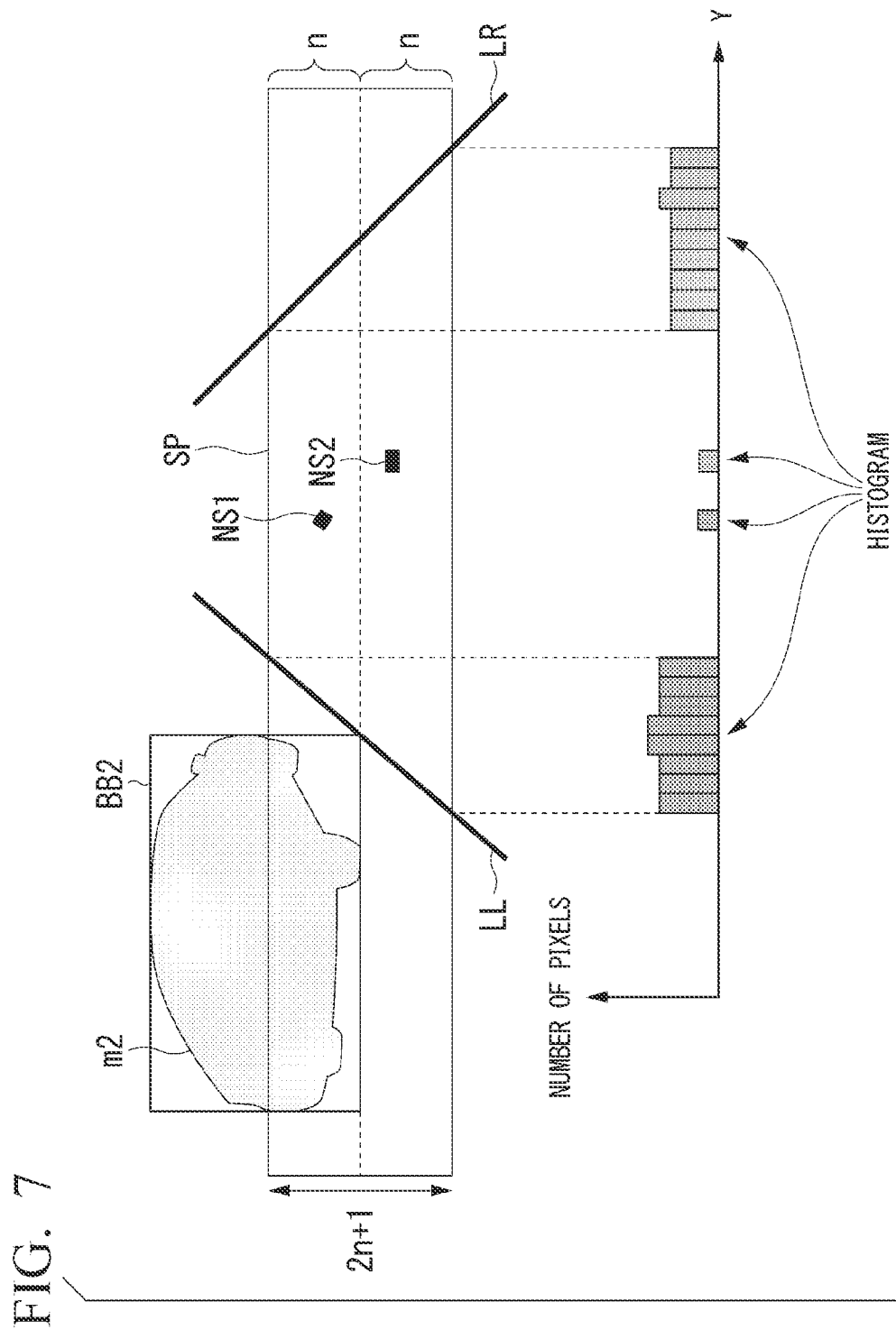
FIG. 7 is a diagram illustrating removal of noise of a demarcation line.

Referring back to FIG. 3, the demarcation line extractor 144 then performs noise removal on the demarcation lines LL and LR extracted within the specific area SP (step S148). FIG. 7 is a diagram illustrating removal of noise from the demarcation lines. For example, the demarcation line extractor 144 generates a histogram obtained by counting the number of pixels when pixels extracted as demarcation lines are projected onto the Y-axis in the specific area SP of the image IM10. The histogram may be obtained, for example, by counting the number of pixels arranged in each predetermined width in a Y-axis direction. The demarcation line extractor 144 extracts a section having a continuous length in the Y-axis direction (a lateral direction) equal to or larger than a predetermined length or a section in which the number of pixels is equal to or larger than a threshold value in the generated histogram, as a section having a demarcation line. This makes it possible to prevent noise NS1 and NS2 such as extraneous matter included in the image from being recognized as demarcation lines, for example, as illustrated in FIG. 7, and to more accurately extract the demarcation lines.

Figure 8:
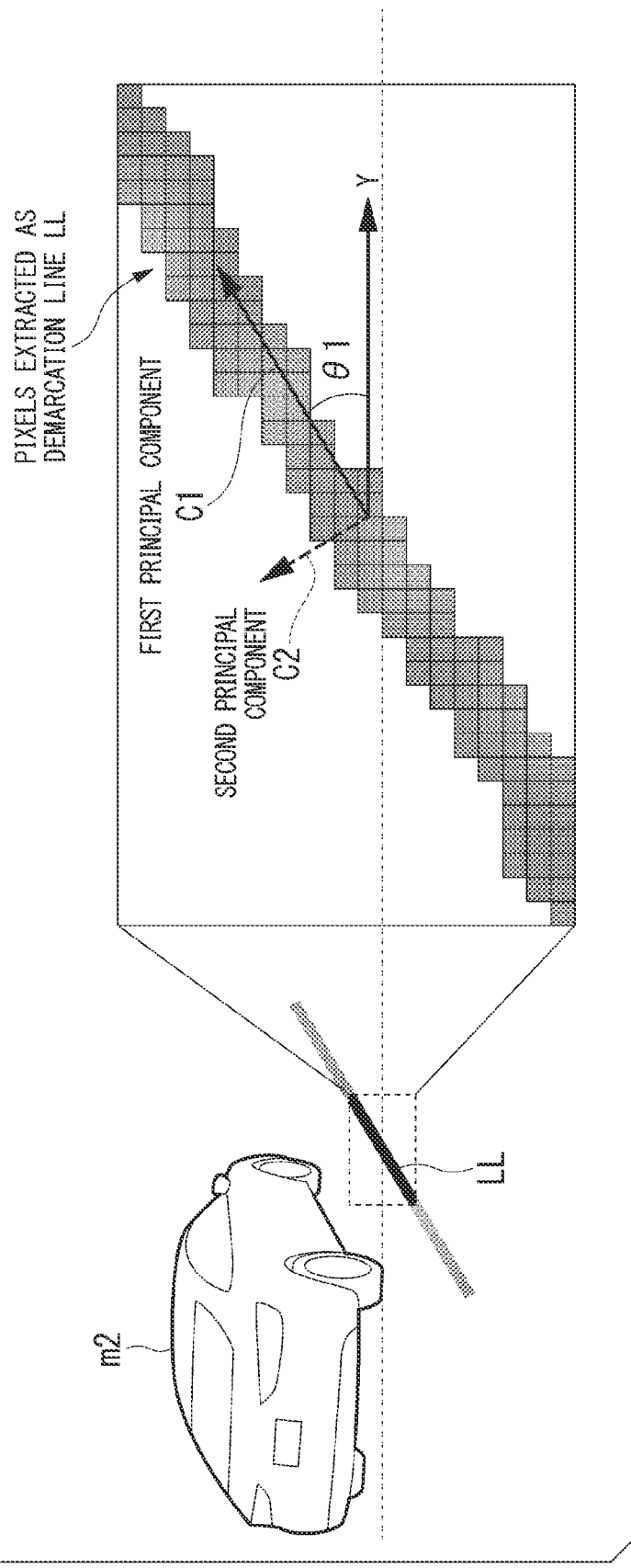
FIG. 8 is a diagram illustrating extraction of an inclination of the demarcation line.

Referring back to FIG. 3, the demarcation line extractor 144 then extracts an inclination of the demarcation line (step S150). The inclination of the demarcation line is, for example, an angle formed between a lower end of the two-dimensional image captured by the second camera 20 and the demarcation line included in the two-dimensional image. For example, the demarcation line extractor 144 derives a first principal component through principal component analysis processing for the demarcation lines LL and LR in the specific area SP. FIG. 8 is a diagram illustrating extraction of the inclination of the demarcation line. In an example of FIG. 8, the demarcation line LL extracted from the specific area SP for the other vehicle m2 is illustrated in an enlarged manner. In an example of FIG. 8, a pixel group (a collection of pixel data) extracted as the demarcation line LL is shown.

The demarcation line extractor 144 performs, for example, existing principal component analysis processing on the pixel group extracted as the demarcation line LL to extract, for example, a direction in which a variance of a principal component score is the largest as an axis C1 of the first principal component. For example, the demarcation line extractor 144 obtains a covariance matrix for coordinates at which pixels corresponding to the demarcation line LL are present within a predetermined image area such as the specific area SP as illustrated in FIG. 8, derives an eigenvector of the covariance matrix, and extracts a direction in which a variance (eigenvalue) is maximized, as the axis C1 of the first principal component, from the derived eigenvector.

The demarcation line extractor 144 may extract an axis perpendicular to the axis C1 of the first principal component as an axis C2 of a second principal component. The demarcation line extractor 144 extracts the axis C1 of the first principal component with respect to the Y-axis as an inclination of the demarcation line LL. The inclination is represented, for example, by the angle θ1 formed by the Y-axis and the axis C1 of the first principal component. The demarcation line extractor 144 similarly extracts, as an inclination of the demarcation line LR, an angle θ2 (not illustrated) formed between a Y-axis (more specifically, a—Y-axis) and an axis C1# (not illustrated) of the first principal component of the demarcation line LR through principal component analysis, for the other demarcation line LR defining the host lane L1. As described above, the demarcation line extractor 144 acquires, as inclinations of the demarcation lines LL and LR, angles when demarcation lines of the specific area SP (an example of the predetermined area) with reference to a position of the demarcation line that meets when the lower end of the bounding box BB2 extends in a lateral direction of the two-dimensional image are viewed from a left-right direction (a Y-axis direction or a lateral direction) of the two-dimensional image.

Referring back to FIG. 3, the edge acquirer 146 then acquires positions of left and right edges of the other vehicle present in the two-dimensional image (step S152). Next, the belonging lane determiner 148 determines a lane in which the other vehicle travels (the lane to which the other vehicle belongs) on the basis of a positional relationship between the left and right edges acquired by the edge acquirer 146 and the demarcation lines (step S154). Next, the target capturer 150 performs capturing of another vehicle (target vehicle) that is a target of the driving control executed by the host vehicle M (step S160). Details of processing of steps S152 to S154 and S160 described above will be described below.

Next, the driving controller 160 executes driving control (either or both of the speed control and the steering control) of the host vehicle M based on the surroundings situation and a behavior of the captured target vehicle (step S170). In the processing of step S120, when there are no other vehicles around the host vehicle M, the driving controller 160 executes driving control of the host vehicle M based on the surroundings situation (step S172). Thus, the processing of the present flowchart ends.

[Acquisition of Left and Right Edges of other Vehicle (Step S152)]

Next, processing of step S152 will be specifically described.

Figure 9:
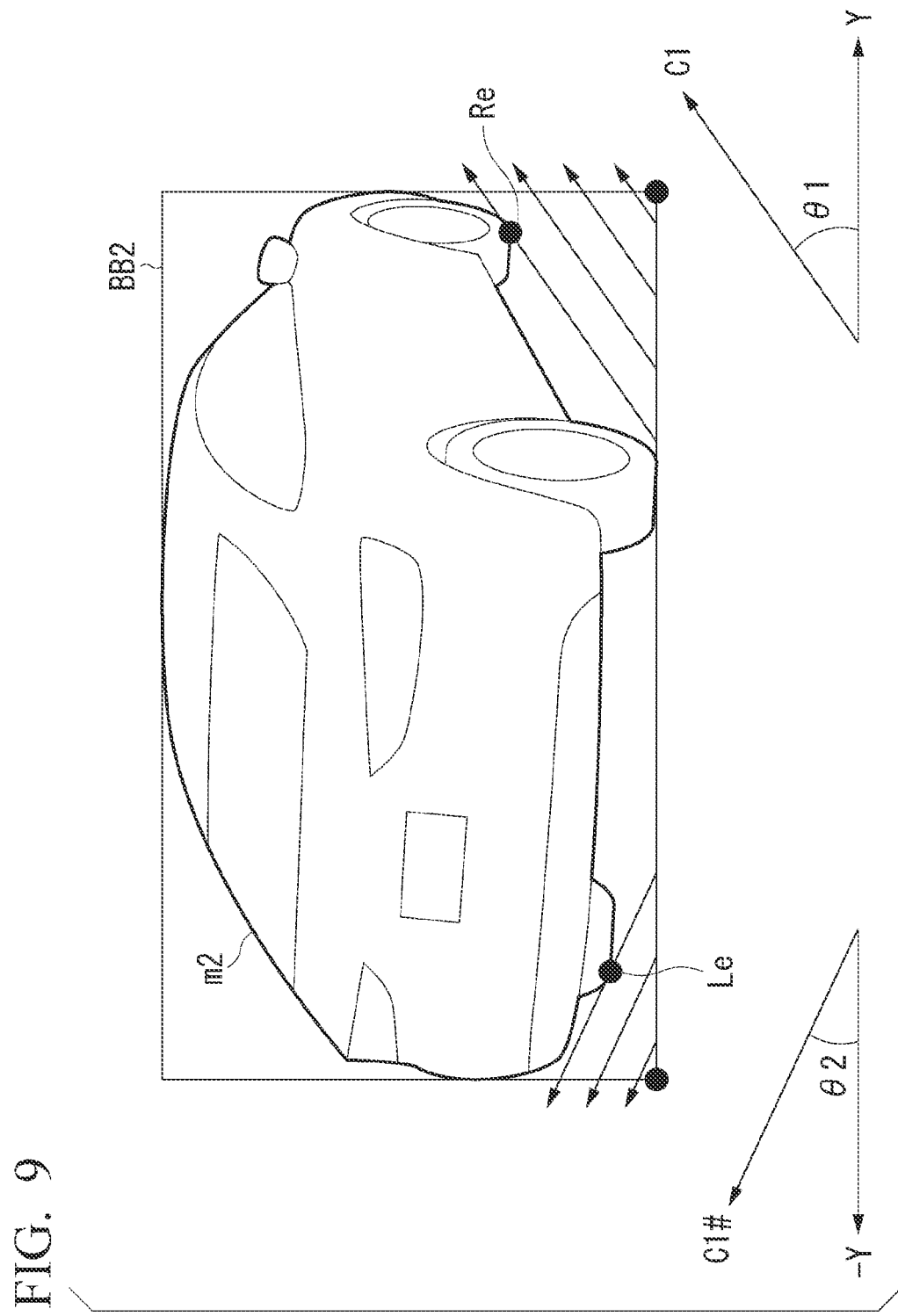
FIG. 9 is a diagram illustrating acquisition of left and right edges of another vehicle.

FIG. 9 is a diagram illustrating acquisition of left and right edges of the other vehicle. In an example of FIG. 9, acquisition of the left and right edges of the other vehicle m2 will be described, but the same processing is performed for other vehicles (the other vehicles m1 and m3) included in the two-dimensional image.

The edge acquirer 146, for example, performs scanning in an oblique direction at an angle serving as a predetermined angle toward the top from the left and right lower ends of the image IM10 captured by the second camera 20 with the inner side of the image IM10 as a center to acquire positions in contact with the contour of the vehicle m2 as edges of the other vehicle m2. The edge acquirer 146 may perform scanning in the above-described oblique direction up to positions at which there are pixels corresponding to the other vehicle m2 (for example, contour pixels of the other vehicle m2) from left and right lower edges of the bounding box BB2 surrounding the contour of the other vehicle m2, rather than from the left and right lower edges of the entire image IM10, to acquire the positions in contact with the contour of the other vehicle m2 as the edges of the other vehicle. It is possible to reduce a processing load as compared to scanning from the entire image IM10 by performing scanning within the bounding box BB2.

Here, for example, the inclinations θ1 and θ2 of the demarcation lines LR and LL that are angles between a lower end of the image IM10 captured by the second camera 20 and the demarcation lines included in the image IM are used as the predetermined angle (scanning angle) at which the scanning is performed. For example, when the edge acquirer 146 performs scanning from a lower right end of the bounding box BB2, the edge acquirer 146 performs scanning at an angle serving as an inclination θ1 of the demarcation line LL toward the top with an inner side as a center from the lower end of the bounding box BB2, and when the edge acquirer 146 performs scanning from a lower left end of the bounding box BB2, the edge acquirer 146 performs scanning at an angle serving as an inclination θ2 of the demarcation line LR toward the top with an inner side as a center from the lower end of the bounding box BB2, as illustrated in FIG. 9. The edge acquirer 146 performs scanning while shifting in a direction away from the left and right lower edges at the same angle, to acquire respective positions in contact with the image of the other vehicle m2 as the left edge Le and the right edge Re. For scanning, for example, each edge may be scanned in the same direction, the edges may be scanned alternately in the same direction and an opposite direction while shifting in a direction away from the lower end, or the edges may be scanned in a zigzag with reference to the same angle, as illustrated in FIG. 9. For example, the left edge Le is the leftmost point when the other vehicle m2 is viewed from above, and the right edge Re is the rightmost point when the other vehicle m2 is viewed from above.

Normally, the other vehicle travels in a direction in which the demarcation lines that define the lane extend. Therefore, an inclination of the other vehicle viewed from the host vehicle M is highly likely to depend on inclinations of demarcation lines of a traveling lane. Therefore, it is possible to more accurately acquire left and right edges (ground contact points) with respect to the inclination of the other vehicle along the lane in the two-dimensional image by performing scanning at a scanning angle with reference to an inclination of the demarcation lines of a travelling lane (that is, demarcation lines of the host lane) of another vehicle traveling in an adjacent lane. In particular, because a body of another vehicle that changes lanes from an adjacent lane to a host lane is directed toward the host lane, it is easy to ascertain a ground contact point of a front wheel of the other vehicle.

When the edge acquirer 146 performs scanning with reference to an angle that is a predetermined angle, the edge acquirer 146 may generate segmentation areas by further dividing the rectangular area of the bounding box BB2 and refer to the generated segmentation areas in a predetermined order to acquire left and right edges. The segmentation area is a rectangular area including one or more pixels.

FIG. 10 is a diagram illustrating acquisition of edges of another vehicle using the segmentation areas. Although in an example of FIG. 10, a state of scanning from a lower right end of the bounding box BB2 corresponding to the other vehicle m2 is shown, the same processing is performed for scanning from a lower left end. The edge acquirer 146 sets a segmentation area SA within the bounding box BB2, and scans the image in the set area in a zigzag manner with reference to the oblique direction at the predetermined angle θ1 described above from a lower right end. In the example of FIG. 10, numbers in the segmentation area SA indicate a scan order set on the basis of an inclination direction C1 of the demarcation line LL. The edge acquirer 146 determines whether or not an image of the other vehicle M is included in each segmentation area, and acquires coordinates of the segmentation area in which the image of the other vehicle is first included (for example, coordinates of a center of the area) as coordinates of the right edge of the other vehicle M. In the example of FIG. 10, it is shown that the edge of the other vehicle M has been detected in a 14th segmentation area after the scanning starts.

When the edge acquirer 146 determines whether or not the image of the other vehicle M is included in each segmentation area, the edge acquirer 146 may determine using images including only necessary information, instead of determining using an original image as it is. For example, image information with a reduced number of bits such as 8 bits is used instead of full-color image information at the time of the determination. This makes it possible to reduce an amount of data used for determination processing, thereby reducing a processing load.

When the scanning angles θ1 and θ2 (angles of the demarcation lines with respect to a left-right direction (a Y-axis direction or a lateral direction) of the image IM10) exceed a threshold angle θth, the edge acquirer 146 sets the predetermined angle to a fixed value. The predetermined angle in this case is, for example, about 40 to 50 degrees and is, preferably, 45 degrees. When an upper limit of the scanning angle is set in this way, it is possible to correctly acquire the right and left edges (ground contact points) with respect to an attitude of the other vehicle, for example, even when the other vehicle travels on a curved road.

[Determination of Lane to which other Vehicle Belongs (step S154)]

Next, processing of step S154 will be specifically described. For example, the belonging lane determiner 148 compares relative positions of the left and right ground contact points viewed from the demarcation lines LL and LR on the basis of positions of the demarcation lines LL and LR of the host lane L1 included in the two-dimensional image captured by the second camera 20 and the left and right ground contact points of the other vehicle, and determines which lane the other vehicle belongs to (or which lane the other vehicle does not belong to). The belonging lane determiner 148 may determine whether or not another vehicle is entering the host lane. "Another vehicle is entering the host lane" is, for example, a case in which at least one of the two left and right edges (ground contact points) of the other vehicle is present in the host lane.

FIG. 11 is a diagram illustrating a determination of a lane to which the other vehicle belongs. Although, in an example of FIG. 11, a scene in which a lane to which the other vehicle m2 belongs is determined will be described, the same processing is performed on other surrounding vehicles (the other vehicles m1 and m3 illustrated in FIG. 4). In the example of FIG. 11, it is assumed that left and right ground contact points (a left ground contact point Le and a right ground contact point Re) of the other vehicle m2 are acquired by the edge acquirer 146.

The belonging lane determiner 148 acquires relative positions LD1 and RD1 of the right ground contact point Re viewed from the left and right demarcation lines LL and LR that define the host lane L1 on the two-dimensional image. The belonging lane determiner 148 acquires relative positions LD2 and RD2 of the left ground contact point Le viewed from the demarcation lines LL and LR. For a reference position of the demarcation lines LL and LR, for example, a position of the demarcation line at the shortest distance from the ground contact points Le and Re from areas of the demarcation lines LL and LR included in the specific area SP with reference to respective positions of the left and right ground contact points Le and Re (an area of (2n+1) rows shifted by n pixels in an up-down direction with reference to the same height as the edge) is acquired.

When a part of the demarcation line cannot be recognized due to the presence of the other vehicle m2 on the demarcation line, the belonging lane determiner 148 may acquire a reference position of the demarcation line at a shortest distance from the above-described ground contact point using a virtual demarcation line obtained by connecting recognizable demarcation lines to the front and rear (front and back) of the non-recognizable part of the demarcation line in a direction in which the host lane L1 extends, linearly or non-linearly according to a shape of the road or a shape of another recognizable demarcation line.

The belonging lane determiner 148 determines whether the relative positions when the ground contact points Le and Re are viewed from the demarcation lines LL and LR are positive or negative. For the relative position, for example, a right direction from a certain reference point RP on the two-dimensional image captured by the second camera 20 is positive, and a left direction is negative. The belonging lane determiner 148 may reverse positive and negative for left and right directions. The belonging lane determiner 148 may perform the determination of positive or negative on the basis of relative positions of the demarcation lines LL and LR when viewed from the ground contact points Le and Re. In the example of FIG. 11, when the right direction is set to positive and the left direction is set to negative, the relative position of the right ground contact point Re viewed from the demarcation line LL is positive (+), the relative position of the left ground contact point Le is negative (−), and the relative positions of the left and right ground contact points Le and Re viewed from the demarcation line LR are both negative (−). The belonging lane determiner 148 may determine a relative position of the ground contact point viewed from the demarcation line when a size (for example, a length) of the relative positions LD1, RD1, LD2, and RD2 is equal to or greater than a predetermined length. This makes it possible to suppress frequent change in signs of positive and negative when the other vehicle is traveling in a state in which the ground contact points of the other vehicle are in the vicinity of the demarcation lines.

Figure 12:
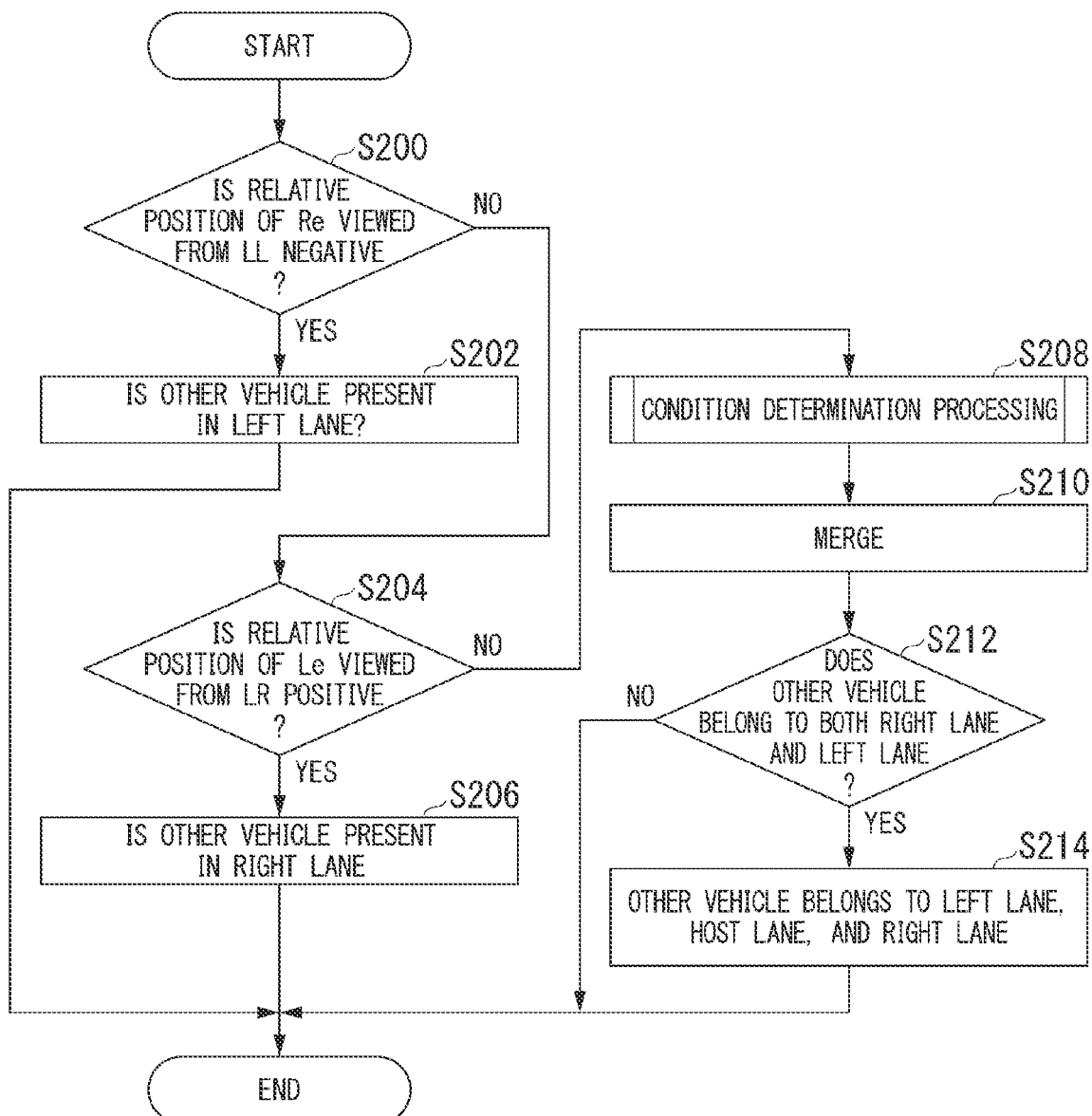
FIG. 12 is a flowchart illustrating an example of a flow of processing for determining a belonging lane.

Next, the belonging lane determiner 148 determines the lane to which the other vehicle m2 belongs on the basis of a positional relationship (relative positions) between the left and right ground contact points Le and Re and the left and right demarcation lines LL and LR. FIG. 12 is a flowchart illustrating an example of a flow of processing for determining a belonging lane. In the example of FIG. 12, first, the belonging lane determiner 148 determines whether or not the relative position of the right ground contact point Re viewed from the left demarcation line LL is negative (step S200). When a determination is made that the relative position of the right ground contact point Re viewed from the left demarcation line LL is negative, a determination is made that the other vehicle m2 is present in the left lane (step S202). When a determination is made that the relative position of the right ground contact point Re viewed from the left demarcation line LL is not negative, the belonging lane determiner 148 determines whether or not the relative position of the left ground contact point Le viewed from the right demarcation line LR is positive (step S204). When a determination is made that the relative position of the left ground contact point Le viewed from the right demarcation line LR is positive, the belonging lane determiner 148 specifies that the other vehicle m2 is present in the right lane (step S206).

When a determination is made that the relative position of the left ground contact point Le viewed from the right demarcation line LR is not positive, the belonging lane determiner 148 executes condition determination processing for the lane to which the other vehicle belongs, using the left and right ground contact points Le and Re and the left and right demarcation lines LL and LR (step S208). In the condition determination processing of step S208, the belonging lane determiner 148 determines whether or not each of a plurality of preset determination conditions is satisfied, and determines that the other vehicle m2 belongs to a lane according to each condition when the condition is satisfied. FIG. 13 is a diagram illustrating a plurality of determination conditions. In an example of FIG. 13, content of the condition and a belonging lane when the condition is satisfied are associated with condition types 1 to 8. Types and content of condition types are not limited thereto.

In the example of FIG. 13, when the relative position of the left ground contact point Le viewed from the left demarcation line LL is positive and the relative position of the left ground contact point Le viewed from the right demarcation line LR is negative (when the condition of condition type 1 is satisfied), the belonging lane determiner 148 determines that the other vehicle m2 belongs to the host lane. When the relative position of the right ground contact point Re viewed from the left demarcation line LL is positive and the relative position of the right ground contact point Re viewed from the right demarcation line LR is negative (when the condition of condition type 2 is satisfied), the belonging lane determiner 148 determines that that the other vehicle m2 belongs to the host lane. When the relative position of the left ground contact point Le viewed from the left demarcation line LL is negative (when the condition of condition type 3 is satisfied), the belonging lane determiner 148 determines that the other vehicle m2 belongs to the left lane. When the relative position of the right ground contact point Re viewed from the right demarcation line LR is positive (when the condition of condition type 4 is satisfied), the belonging lane determiner 148 determines that the other vehicle m2 belongs to the right lane.

When the relative position of the left ground contact point Le viewed from the left demarcation line LL is negative and the relative position of the right ground contact point Re viewed from the left demarcation line LL is positive (when the condition of condition type 5 is satisfied), the belonging lane determiner 148 determines that the other vehicle m2 belongs to the left lane and the host lane. When the relative position of the left ground contact point Le viewed from the right demarcation line LR is negative and the relative position of the right ground contact point Re viewed from the right demarcation line LR is positive (when the condition of condition type 6 is satisfied), the belonging lane determiner 148 determines that the other vehicle m2 belongs to the right lane and the host lane. When the relative position of the left ground contact point Le viewed from the left demarcation line LL is positive and the relative position of the right ground contact point Re viewed from the right demarcation line LR is negative (when the condition of condition type 7 is satisfied), the belonging lane determiner 148 determines that the other vehicle m2 belongs to the host lane. When the relative position of the right ground contact point Le viewed from the left demarcation line LL is positive and the relative position of the left ground contact point Le viewed from the right demarcation line LR is positive (when the condition of condition type 8 is satisfied), the belonging lane determiner 148 determines that that the other vehicle m2 belongs to the host lane.

After the processing of step S208 ends, the belonging lane determiner 148 merges (OR processing or logical sum operation) determination results based on the respective conditions (step S210), and determines whether or not the other vehicle m2 belongs to both the right lane and the left lane as a merging result (step S212). When the belonging lane determiner 148 determines that the other vehicle m2 belongs to both the right lane and the left lane, the belonging lane determiner 148 determines that the other vehicle m2 belongs to the left lane, the host lane, and the right lane (step S214). Thus, the present flowchart ends.

FIG. 14 is a diagram illustrating content of the processing of steps S212 to S214. In an example of FIG. 14, a presence settlement flag "1" is set for the lane to which the other vehicle is determined to belong when the respective conditions of condition type 3 and condition type 4 are satisfied. For example, when the presence settlement flag is also set in both the left and right lanes for one other vehicle according to the condition determination of condition type 3 and condition type 4, the belonging lane determiner 148 determines that the other vehicle is also present in the host vehicle and sets "1" in a presence settlement flag of the host lane. This makes it possible for the belonging lane determiner 148 to recognize that the other vehicle belongs to (is present in) the host lane and the left and right lanes. For the flag, a flag such as a character such as "YES" or "O", or a mark may be set instead of the flag of "1".

Although the belonging lane determiner 148 has determined the lane to which the other vehicle m2 belongs (a presence settlement lane), the belonging lane determiner 148 may determine a lane to which the other vehicle m2 does not belong (an absence settlement lane) instead of (or in addition to) such a determination. In this case, the belonging lane determiner 148 makes a determination on the basis of a predetermined determination condition for specifying an absence settlement lane. FIG. 15 is a diagram illustrating processing for determining the absence settlement lane. In an example of FIG. 15, condition content and an absence lane are associated with condition types A to D for specifying absence settlement lane. Types and content of condition types are not limited thereto.

In the example of FIG. 15, when the relative position of the right ground contact point Re viewed from the left demarcation line LL is negative (when the condition of condition type A is satisfied), the belonging lane determiner 148 determines that the other vehicle m2 is absent in (does not belong to) the host lane and the right lane. When the relative position of the left ground contact point Le viewed from the right demarcation line LR is positive (when the condition of condition type B is satisfied), the belonging lane determiner 148 determines that the other vehicle m2 is absent in the host lane and the left lane. When the relative position of the left ground contact point Le viewed from the left demarcation line LL is positive (when the condition of condition type C is satisfied), the belonging lane determiner 148 determines that the other vehicle m2 is absent in the left lane. When the relative position of the right ground contact point Re viewed from the right demarcation line LR is negative (when the condition of condition D is satisfied), the belonging lane determiner 148 determines that the other vehicle m2 is absent in the right lane. The belonging lane determiner 148 merges respective determination results based on conditions A to D to determine in which lane the other vehicle is absent.

The belonging lane determiner 148 may generate information in which a flag indicating a presence settlement lane and an absence settlement lane (absence lane) is set for each other vehicle for the host lane, the left lane, and the right lane on the basis of the determination result of the belonging lane for the other vehicle m2. FIG. 16 is a diagram illustrating an example of information in which a flag is set. The information illustrated in FIG. 16 is an example of the relative lateral position information of the other vehicle viewed from the host vehicle M, and is an example of relative position information of the other vehicle and the host vehicle M.

In the example of FIG. 16, an example of a flag set when a positional relationship in the two-dimensional image (planar image) between the other vehicle m2 and the demarcation lines LL and LR that define the host lane is the relationship illustrated in FIG. 11 is shown. In the example of FIG. 16, for each of the left lane, the host lane, and the right lane, a flag "1" is set in a lane in which the presence of the other vehicle m2 is settled and a lane in which the absence of the other vehicle m2 is settled. According to the example of FIG. 16, it is possible to specify that the other vehicle m2 is present in the left lane and the host lane, but is not present in the right lane, according to the processing of the belonging lane determiner 148. For example, when it is found that the other vehicle m2 is not present in the host lane as the absence settlement lane, this can be used for processing such as target vehicle selection or speed control in subsequent driving control such as tracking control. In the example of FIG. 16, different flags may be set for the presence settlement flag and the absence settlement flag.

The belonging lane determiner 148 can determine one or both of a lane to which the other vehicle belongs (presence settlement lane) and a lane to which the other vehicle does not belong (absence settlement lane), for example, even when one or a part of the left and right demarcation lines LL and LR that define the host lane cannot be recognized from the two-dimensional image captured by the second camera 20. The demarcation line cannot be recognized, for example, when extraction of edges of the demarcation line cannot be performed from the two-dimensional image. Hereinafter, several determination patterns for the belonging lane in a situation in which the demarcation lines cannot be recognized will be described.

<First Determination Pattern>

FIG. 17 is a diagram illustrating a first determination pattern.

The first determination pattern is a determination pattern for determining a presence settlement lane (affiliated lane) of the other vehicle m2 when the right demarcation line LR among the left and right demarcation lines LL and LR that define the host lane L1 cannot be recognized. In the first determination pattern, the belonging lane determiner 148 determines the presence settlement lane of the other vehicle m2 on the basis of the respective relative positions of the right ground contact point Re and the left ground contact point Le viewed from the left demarcation line LL. In the example of FIG. 17, it can be seen that, because the relative position of the right ground contact point Re viewed from the left demarcation line LL is positive and the relative position of the left ground contact point Le viewed from the left demarcation line LL is negative, the ground contact points Re and Le are present to straddle the demarcation line LL (the ground contact points (edges) are present on the left and right sides of the left demarcation line LL). Therefore, in the first determination pattern, the belonging lane determiner 148 cannot recognize whether or not the other vehicle m2 belongs to the right lane, but determines that the other vehicle m2 belongs to at least the host lane L1 (more specifically, the other vehicle m2 belongs to the host lane L1 and the left lane).

<Second Determination Pattern>

Figure 18:
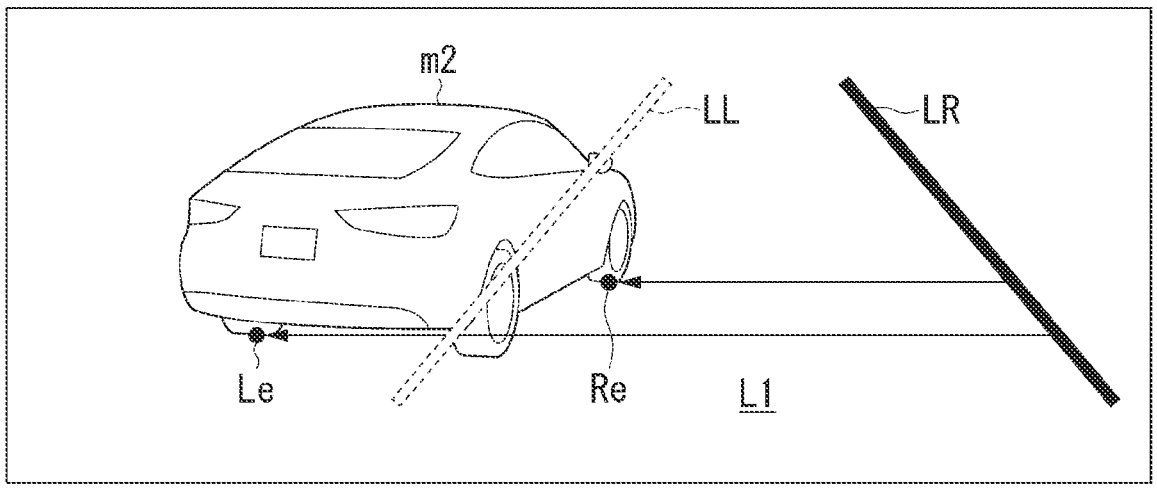
FIG. 18 is a diagram illustrating a second determination pattern.

FIG. 18 is a diagram illustrating a second determination pattern. The second determination pattern is a determination pattern for determining an absence settlement lane of the other vehicle m2 when the left demarcation line LL among the demarcation lines LL and LR that define the host lane L1 cannot be recognized. In the second determination pattern, the belonging lane determiner 148 determines the absence settlement lane on the basis of the respective relative positions of the right ground contact point Re and the left ground contact point Le viewed from the right demarcation line LR. In the example of FIG. 18, the relative positions of the right ground contact point Re and the left ground contact point Le viewed from the right demarcation line LR are both negative. Therefore, in the second determination pattern, the belonging lane determiner 148 determines that the other vehicle m2 does not belong to the right lane (the right lane is the absence settlement lane).

<Third Determination Pattern>

Figure 19:
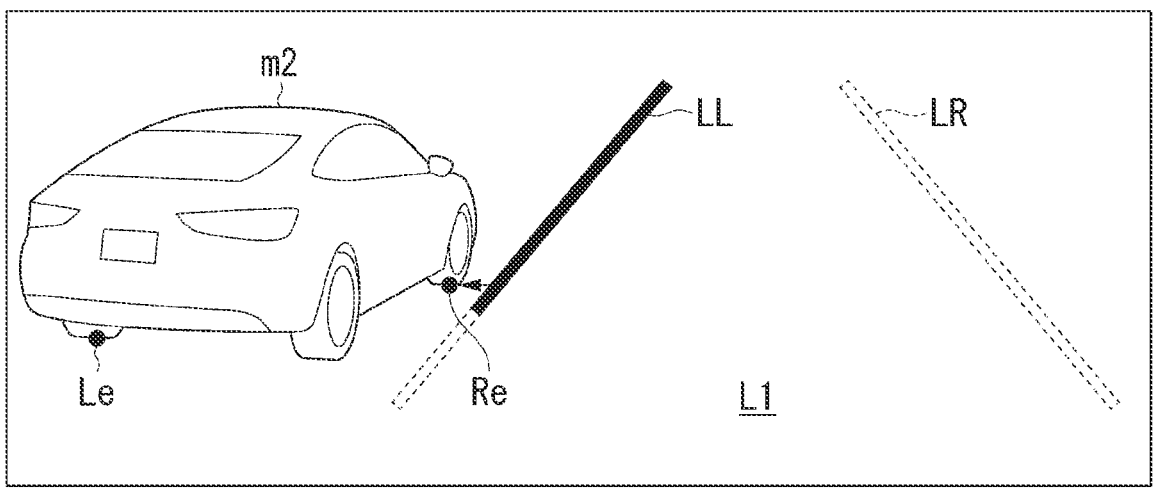
FIG. 19 is a diagram illustrating a third determination pattern.

FIG. 19 is a diagram illustrating a third determination pattern. The third determination pattern is a determination pattern for determining one or both of the presence settlement lane and the absence settlement lane of the other vehicle m2 when all of one of the demarcation lines and part of the other cannot be recognized. In an example of FIG. 19, a scene in which a part of the left demarcation line LL is not recognized (only a part is recognized), in addition to the right demarcation line LR being not recognized, is shown. For the left demarcation line LL, the demarcation line LL included in a specific area in a horizontal direction (a lateral direction of the image) of the right ground contact point Re is recognized, but the demarcation line LL included in a specific area in the horizontal direction of the left ground contact point Le is not recognized. Therefore, a relative position between the demarcation line LL and the left ground contact point Le cannot be acquired. In this case, the belonging lane determiner 148 determines the lane to which the other vehicle m2 belongs on the basis of only the relative position of the right ground contact point Re viewed from the demarcation line LL.

In the example of FIG. 19, the relative position of the right ground contact point Re of the other vehicle m2 viewed from the demarcation line LL is negative. Therefore, the belonging lane determiner 148 can determine that the other vehicle m2 belongs to the left lane (the left lane is the presence settlement lane of the other vehicle m2). The belonging lane determiner 148 can also determine that the other vehicle m2 does not belong to the host lane L1 and the right lane (the host lane L1 and the right lane are absence settlement lanes of the other vehicle m2).

<Fourth Determination Pattern>

FIG. 20 is a diagram illustrating a fourth determination pattern. The fourth determination pattern is a determination pattern for determining the presence settlement lane of the other vehicle m2 in a first scene in which a part of each of both the demarcation lines LL and LR cannot be recognized. In the example of FIG. 20, it is assumed that the right demarcation line LR between the demarcation lines LL and LR can be recognized in a Y-axis direction (a left-right direction of the two-dimensional image) at the right ground contact point Re of the host vehicle M, and only the left demarcation line LL can be recognized in the Y-axis direction at the left ground contact point Le. In this case, the belonging lane determiner 148 determines that the other vehicle m2 belongs to the host lane L1 (the host lane L1 is the presence settlement lane of the other vehicle m2) in the first scene as illustrated in FIG. 20 because a body of the host vehicle M is present at the left and right ground contact points Le and Re.

FIG. 21 is a diagram illustrating a second scene in which a part of each of both demarcation lines cannot be recognized. In the second scene of the fourth determination pattern, only the demarcation line LL between the demarcation lines LL and LR can be recognized in the Y-axis direction at the right ground contact point Re of the host vehicle M, and only the demarcation line LR can be recognized in the Y-axis direction at the left ground contact point Le. In this case, the belonging lane determiner 148 can determine that the other vehicle m2 belongs to the host lane L1 even in the scene illustrated in FIG. 21 because the body of the host vehicle M is present at the left and right ground contact points Le and Re. It is possible to ascertain a presence settlement lane or an absence settlement lane of another vehicle through a determination based on a relative position using a recognized part of the lane even in a state in which a part of the lane is not recognized, as in the fourth determination pattern described above.

When the determination is performed on the basis of the first to fourth determination patterns described above, it is possible to determine one or both of the lane to which the other vehicle belongs (the presence settlement lane) or the lane to which the other vehicle does not belong (the absence settlement lane), for example, even when one side or a part of the demarcation line cannot be recognized (edge extraction cannot be performed) due to bad weather, or the like. Using the processing for determining the belonging lane described above, it is possible to further improve the accuracy of the determination of the lane to which the other vehicle belongs.

[Target Capturing (step S160)]

Figure 22:
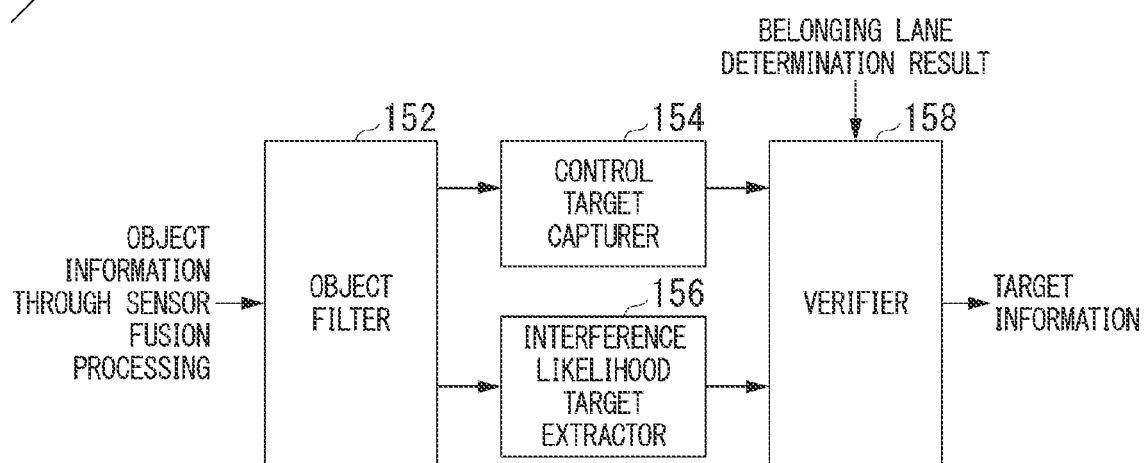
FIG. 22 is a diagram illustrating a function of the target capturer.

Next, details of target capturing processing will be described. FIG. 22 is a diagram illustrating a function of the target capturer 150. The target capturer 150 includes, for example, an object filter 152, a control target capturer 154, an interference likelihood target extractor 156, and a verifier 158.

The object filter 152, for example, extracts other vehicles (an example of the target objects) present in three lanes including the host lane, the left lane, and the right lane among objects present around the host vehicle M on the basis of information on objects around the host vehicle M obtained through the sensor fusion processing of the recognizer 120. For example, the object filter 152 converts an image captured by the first camera 10 into a bird's-eye view coordinate system (three-dimensional coordinate transformation), and extracts other vehicles present in the three lanes on the basis of positions, shapes, or the like of objects on the image.

When the host vehicle M executes the driving control such as ACC, the control target capturer 154 captures, as the target vehicle (a tracking target vehicle), the other vehicle that the host vehicle M tracks from among the other vehicles extracted by the object filter 152. The other vehicle that the host vehicle M tracks is, for example, a preceding vehicle that is present on a scheduled trajectory along which the host vehicle M travels or is likely to be present on the scheduled trajectory in future. The control target capturer 154 captures, as a new target vehicle, a preceding vehicle present in a lane that is a lane change destination, for example, when the host vehicle M changes lanes.

Figure 23:
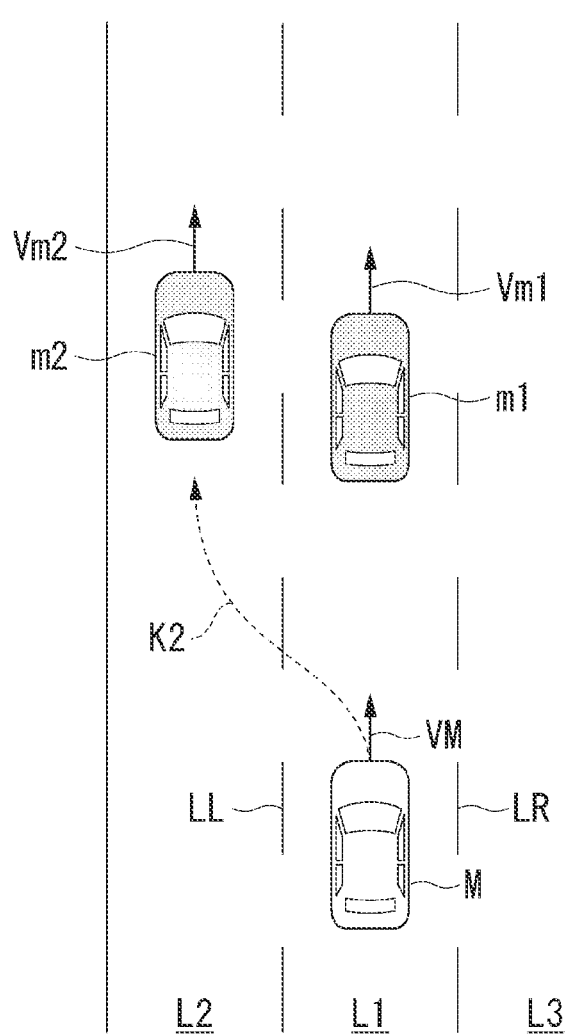
FIG. 23 is a diagram illustrating a setting of a control transition ratio in a switching period of a target vehicle.

The control target capturer 154 sets a control transition ratio in a switching period of the target vehicle when the target vehicle is switched due to lane change. FIG. 23 is a diagram illustrating a setting of the control transition ratio in the switching period of the target vehicle. In the example of FIG. 23, it is assumed that the host vehicle M travels in a middle lane L1 of a road, which includes three lanes L1 to L3 that vehicles can travel in the same direction, at a speed VM, another vehicle m1 travels at a speed Vm1 in front of the host vehicle M, and another vehicle m2 travels at a speed Vm2 in the lane L2 on the left side of the host lane L1 in front of the host vehicle M. In the example of FIG. 23, it is assumed that the host vehicle M travels while tracking the other vehicle m1 under the driving control such as ACC.

In this situation, when the host vehicle M further performs lane change (for example, ALC) from the lane L1 to the lane L2, the control target capturer 154 switches the tracking target vehicle (the target vehicle) from the other vehicle m1 to the other vehicle m2. For example, the control target capturer 154 sets the control transition ratio on the basis of the relative positions or speeds of the tracking other vehicles m1 and m2 at each position on a scheduled trajectory K1 until the host vehicle M performs lane change from the lane L1 to the lane L2. This makes it possible to execute driving control that provides a smooth behavior at the time of lane change, for example, by performing adjustment (correction) of content of control, such as speed or steering, according to a ratio such as 70% for control of a behavior of the other vehicle m1 and 30% for control of a behavior of the other vehicle m2.

For the setting of the control transition ratio described above, since the target vehicle of the host vehicle M is switched from the other vehicle m1 to the other vehicle m2, for example, even when the other vehicle m2 enters between the host vehicle M and the other vehicle through lane change in a state in which the host vehicle M tracks the other vehicle m1, the control transition ratio described above is set in the switching period, and the driving control based on the set ratio is executed.

The interference likelihood target extractor 156, for example, sets an area within a predetermined distance in a traveling direction from a reference position (for example, a distal edge or a center of gravity) of the host vehicle M, including the host lane and the left and right lanes thereof, as an interference likelihood area, and extracts other vehicles present in the area as target vehicles likely to interfere. The predetermined distance may be a fixed distance or may be variably set on the basis of a road shape, road type, speed of the host vehicle, or the like. The interference likelihood target extractor 156 may extract a predetermined number of other vehicles from each of the left lane, the host lane, and the right lane or may extract a predetermined number of other vehicles from side close to the host vehicle when a sum of other vehicles in the three lanes exceeds a threshold value. Further, when the driving controller 160 is executing ACC (tracking traveling in which the host vehicle M tracks a preceding vehicle), the interference likelihood target extractor 156 extracts a cut-in vehicle (another vehicle) that has entered (cut into) the host lane from an adjacent lane between the preceding vehicle and the host vehicle M as a target vehicle likely to interfere with the host vehicle M. When the target vehicle likely to interfere is extracted, it is possible to execute more appropriate driving control, for example, while the driving controller 160 adjusting (correcting) the content of the control such as speed or steering so that the host vehicle does not come in contact with the target vehicle.

The verifier 158 verifies whether or not the target vehicle is a correct target for driving control (speed control and driving control) of the host vehicle M, on the basis of the target vehicle captured by the control target capturer 154 and the target vehicle extracted by the interference likelihood target extractor 156, and the result of determining the lane to which the other vehicle belongs in the belonging lane determiner 148. The respective target vehicles (for example, the other vehicles m1 to m3) and the respective other vehicles (for example, the other vehicles m1 to m3) whose belonging lane is determined by the belonging lane determiner 148 are associated according to, for example, a relative position, shape, or size from the host vehicle M.

For example, when the belonging lane determiner 148 determines that the target vehicle (the other vehicle) recognized as being present in the host lane L1, which has been extracted as the control target or the interference likelihood target, does not belong to the host lane L1 (or is present in another lane other than the host lane), the verifier 158 determines that the target vehicle is an incorrect target for driving control and corrects the recognition result of the recognizer 120. Specifically, the verifier 158 excludes the other vehicle that does not belong to the host lane L1 (or that is present in another lane other than the host lane) among the other vehicles extracted as target vehicles on the basis of the recognition result of the recognizer 120, from the target vehicles (the vehicles that are targets for driving control).

Thus, since the two-dimensional image has a smaller error in a position of the target object as compared with the recognizer 120 that recognizes an object while using three-dimensional image conversion or the like, it is possible to suppress excessive speed control or the like due to erroneous recognition by excluding a target vehicle not necessary for driving control using a result of determining the lane to which the other vehicle belongs on the basis of on the two-dimensional image (the relative lateral position information of the other vehicle). The verifier 158 may correct a position of a target vehicle that is an exclusion target to match the belonging lane determined by the belonging lane determiner 148 instead of excluding the target vehicle not necessary for driving control.

When the belonging lane determiner 148 determines that the recognized target vehicle (other vehicle) present in the host lane L1 belongs to (is present in) the host lane L1, the verifier 158 determines the target vehicle to be a correct target for driving control and outputs information on the other vehicle that is the target (target information).

The speed controller 162 performs the speed control of the host vehicle M on the basis of the target information output by the verifier 158. For example, the speed controller 162 calculates a tracking goal control amount for tracking at an appropriate inter-vehicle distance for the tracking target on the basis of a state quantity of the target vehicle (a relative distance from the target vehicle, relative speed, goal inter-vehicle), or the like included in the target information. The speed controller 162 adjusts a control amount on the basis of an interference state with the interference likelihood target included in the target information not to exceed a G limit determined according to acceleration or deceleration of the host vehicle M in advance (a limit value of G in the front and rear of the host vehicle M obtained from the vehicle sensor 40). The speed controller 162 adjusts a tracking control amount on the basis of information such as a behavior (position and speed) of the interference likelihood target, for another vehicle that performs lane change into the host lane L1 or another vehicle that travels in a state in which the other vehicle has partially entered the host lane (an example of the interference likelihood target). When there is an interference likelihood target that has not been captured as the control target, the speed controller 162 may perform the adjustment according to a state such as a behavior of the interference likelihood target. The speed controller 162 generates a speed profile for causing the host vehicle M to travel on the basis of the tracking control amount obtained by the adjustment or the like and a current speed control amount of the host vehicle M, and executes the speed control of the host vehicle M on the basis of the generated speed profile.

The steering controller 164 also executes driving control such as ALC or LKAS on the basis of the target information described above to prevent contact with other vehicles.

This makes it possible to perform appropriate correction on a positional deviation of the target vehicle due to, for example, a recognition error of the object recognized on the basis of three-dimensional image conversion for a camera image or outputs of a plurality of sensors. It is possible to improve the accuracy of recognition of the tracking target vehicle or a cut-in vehicle. When the belonging lane determiner 148 determines that a vehicle is not present in the host lane, it is possible to exclude the vehicle from the tracking target vehicle or the cut-in vehicle and suppress excessive deceleration. This makes it possible to perform vehicle control with little sense of discomfort to the occupant.

The HMI controller 170 may generate an image on which the other vehicle recognized as the target vehicle and the other vehicles excluded from the target vehicle can be distinguished, and cause the generated image to be displayed on the display of the HMI 30. This makes it possible to more accurately notify the occupant of the target vehicle for driving control.

As described above, according to the embodiment, the vehicle control device includes the second camera (an example of the imager) 20 that images the surroundings of the host vehicle M, the recognizer 120 that recognizes the surroundings situation of the host vehicle M, the driving controller 160 that controls one or both of speed and steering of the host vehicle M on the basis of the recognition result of the recognizer 120, and the controller 140 that controls the driving controller 160 on the basis of imaging content of the second camera 20, wherein the controller 140 performs scanning on an object present around the host vehicle M on the two-dimensional image captured by the second camera 20 at an angle serving as a predetermined angle upward from left and right lower ends of the two-dimensional image, and sets a point first coming in contact with the object as a ground contact point of the object, thereby more accurately recognizing the position of the object included in the image and performing the driving control of the host vehicle. Therefore, it is possible to further improve traffic safety.

Specifically, according to the embodiment, it is possible to suppress a positional deviation of the object (a deviation of the belonging lane) that occurs when estimation is performed on the basis of a three-dimensional conversion image (bird's-eye view image) in the recognizer 120 or outputs of a plurality of sensors, by determining the belonging lane on the basis of a positional relationship between the demarcation line and the edge of the target object on the two-dimensional image captured by the second camera 20. According to the embodiment, it is possible to improve the accuracy of the determination of the lane to which the other vehicle belongs, by determining the edges to be the ground contact points when the target object is the other vehicle. According to the embodiment, it is possible to limit a search range on the image and reduce a processing cost by acquiring the ground contact points that are left and right edges by referring to a segmentation image from rectangle information of the bounding box. According to the embodiment, it is possible to accurately recognize the belonging lane even when another vehicle straddles the lane.

According to the embodiment, complicated determination processing such as the related art is unnecessary and it is possible to reduce a processing load by performing scanning in an oblique direction from the left and right lower ends of the segmentation image and setting a portion first coming in contact with the object as the ground contact point of the object. According to the embodiment, it is possible to improve the detection accuracy of the ground contact point of the target object by setting a scanning angle to the same angle as that of the demarcation line, to an angle of the demarcation line present in a horizontal direction at a lower end of a rectangle of the bounding box, or a fixed angle (for example, 45 degrees) when the scanning angle is equal to or larger than a predetermined value.

The embodiment described above can be expressed as follows.

A vehicle control device
including:
a storage device that stores a program, and
a hardware processor, and
configured to
image surroundings of a host vehicle using an imager;
recognize a surroundings situation of the host vehicle;

execute driving control to control one or both of speed and steering of the host vehicle on the basis of a result of the recognition;

control the driving controller on the basis of imaging content of the imager; and perform scanning on an object present around the host vehicle on a two-dimensional image captured by the imager at an angle serving as a predetermined angle upward from left and right lower ends of the two-dimensional image, and set a point first coming in contact with the object as a ground contact point of the object, by the hardware processor executing the program stored in the storage device.

Although the modes for carrying out the present invention have been described above using the embodiments, the present invention is not limited to these embodiments and various modifications and substitutions can be made without departing from the gist of the present invention.

What is claimed is:

1. A vehicle control device comprising:
    an imager configured to image surroundings of a host vehicle;
    a recognizer configured to recognize a surroundings situation of the host vehicle;
    a driving controller configured to control one or both of speed and steering of the host vehicle on the basis of a result of the recognition of the recognizer; and
    a controller configured to control the driving controller on the basis of imaging content of the imager,
    wherein the controller performs scanning in oblique direction on an image area enclosed by outlines of an object present around the host vehicle included in a two-dimensional image captured by the imager at an angle serving as a predetermined angle upward from left and right lower ends of the image area, and sets a point first coming in contact with the object as a ground contact point of the object.

2. The vehicle control device according to claim 1, wherein the controller sets a rectangular area surrounded by the object on the two-dimensional image as the image area, and performs scanning in oblique direction each set rectangular area upward from left and right lower ends of the rectangular area at the angle serving as the predetermined angle, to acquire the left and right ground contact points of the object.

3. The vehicle control device according to claim 2, wherein the predetermined angle is an angle formed by the lower end of the two-dimensional image captured by the imager and a demarcation line included in the two-dimensional image.

4. The vehicle control device according to claim 3, wherein the predetermined angle is an angle when demarcation lines of a predetermined area with reference to a position of the demarcation line coming in contact when the lower end of the rectangular area extends in a lateral direction of the two-dimensional image is viewed from a left-right direction of the two-dimensional image.

5. The vehicle control device according to claim 4, wherein the controller sets the predetermined angle to a fixed value when the angle of the demarcation line with respect to the left-right direction of the two-dimensional image exceeds a threshold value.

6. The vehicle control device according to claim 5, wherein the fixed value is 45 degrees.

7. The vehicle control device according to claim 1, wherein the controller corrects a position of the object recognized by the recognizer on the basis of the ground contact point of the object, and controls the driving controller on the basis of the corrected position of the object.

8. A vehicle control method comprising, on a computer:
    imaging, by an imager, surroundings of a host vehicle;
    recognizing a surroundings situation of the host vehicle;
    executing driving control to control one or both of speed and steering of the host vehicle on the basis of a result of the recognition;
    controlling the driving controller on the basis of imaging content of the imager; and
    performing scanning in oblique direction on an image area enclosed by outlines of an object present around the host vehicle included in a two-dimensional image captured by the imager at an angle serving as a predetermined angle upward from left and right lower ends of the image area, and setting a point first coming in contact with the object as a ground contact point of the object.

9. A computer-readable non-transitory storage medium having a program stored therein, the program causing a computer to:
    image surroundings of a host vehicle using an imager;
    recognize a surroundings situation of the host vehicle;
    execute driving control to control one or both of speed and steering of the host vehicle on the basis of a result of the recognition;
    control the driving controller on the basis of imaging content of the imager; and
    perform scanning in oblique direction on an image area enclosed by outlines of an object present around the host vehicle included in a two-dimensional image captured by the imager at an angle serving as a predetermined angle upward from left and right lower ends of the image area, and set a point first coming in contact with the object as a ground contact point of the object.

* * * * *